United States Patent [19]

Lesher

[11] 3,917,911

[45] Nov. 4, 1975

[54] SECURITY ENTRY SYSTEMS

[76] Inventor: James M. Lesher, 7315 Lankershim Blvd., North Hollywood, Calif. 91609

[22] Filed: Feb. 15, 1974

[21] Appl. No.: 442,771

Related U.S. Application Data

[63] Continuation-in-part of Ser. No. 319,043, Dec. 27, 1972, abandoned.

[52] U.S. Cl. .............................. 179/37; 179/18 BA

[51] Int. Cl.[2] ........................................ H04M 11/00

[58] Field of Search ..... 179/2 A, 37, 18 BA, 18 BE, 179/18 ES, 90 B, 90 BB

[56] References Cited

UNITED STATES PATENTS

| | | | |
|---|---|---|---|
| 3,325,602 | 6/1967 | Truby | 179/18 DA |
| 3,334,190 | 8/1967 | Jenkins et al. | 179/18 DA |
| 3,484,561 | 12/1969 | Matthews | 179/37 |
| 3,557,318 | 1/1971 | Buonsante et al. | 179/39 |
| 3,600,522 | 8/1971 | Benson | 179/18 BA |

*Primary Examiner*—William C. Cooper
*Assistant Examiner*—Gerald L. Brigance
*Attorney, Agent, or Firm*—Lawrence V. Link, Jr.

[57] ABSTRACT

According to one disclosed embodiment of the invention, a controlled entry computer responds to a code number dialed on a foyer telephone to retrieve the actual telephone number of the called apartment from a preprogrammed digital memory; dials the retrieved number and connects, via the standard switched telephone network (common carrier), the phone in the apartment to the foyer phone. The called party may authorize entry by activating a hand held tone generator next to the mouthpiece of his phone; and logic circuits, which respond only to signals of approximately the same frequency as produced by the tone generator and which originate from the called apartment, sense the authorization signal and in response thereto release the latch mechanism of an entry gate. In accordance with a second embodiment of the invention, the called party may authorize entry by depressing a preselected key button on a touch-tone phone or by dialing a preselected digit on a dial type phone set.

15 Claims, 19 Drawing Figures

SECURITY ENTRY SYSTEMS

CROSS-REFERENCE TO A RELATED APPLICATION

This application is a continuation-in-part of copending U.S. Pat. application Ser. No. 319,043; for Security Entry System; filed Dec. 27, 1972 now abandoned.

BACKGROUND OF THE INVENTION

The subject invention relates generally to entry control systems, and particularly to such systems which allow occupants to remotely control a gate lock so as to allow entry to persons who telephone and whose entry is approved.

It has become increasingly important to limit access to various areas, such as apartment complexes, for example to persons authorized entry by the occupants. One prior approach to meeting this need has involved the intercom type installation, whereby the entry area is selectively connectable to intercom units in each apartment unit, and entry is authorized by the occupant operating a control device wired to the gate lock actuation system. One drawback with these intercom type systems is the need for additional wiring to each apartment; and for large complexes having hundreds of units the expense and inconvenience of installing the intercom wiring in existing buildings is almost prohibitive. Additionally considerable maintenance expenses, associated with the plurality of intercom units, could be encountered.

The system described in U.S. Pat. No. 3,557,318 alleviates the problem described above relative to the need for additional wiring to each apartment for the intercom type installations, by using a portion of the normal telephone installation in the apartment complex as part of the entry control system. However systems in accordance with the above cited patent require a rather complex "miniature central telephone switching unit" which could prove costly to build and maintain. The need for the complex "switching unit" is inherent to these systems as a result of their basic approach whereby calls from the entry area do not pass through the normal central telephone office equipment but instead must be routed by means of the special switching unit at the apartment complex to each apartment unit.

SUMMARY OF THE INVENTION

It is a primary object of the subject invention to provide an efficient, reliable and relatively inexpensive security entry system.

Another object is to provide an entry control system adaptable to multiple unit apartment applications and which does not require special wiring to the individual apartments so as to be relatively inexpensive to install and convenient to maintain.

A further object is to provide a multi approval station entry control system adaptable to reliable digital implementations and wherein the connections to the plurality of approval stations is provided by means of telephone equipment in the normal telephone service configuration.

Yet another object is to provide an improved security entry system wherein installation costs are minimized by providing the connections to the plurality of approval stations by means of equipment used in normal telephone service, but wherein the actual telephone number of the approval stations need not be disclosed to the persons requesting entry.

A still further object is to provide a security entry system wherein connections to the plurality of using units are provided by equipment required for normal telephone service, and wherein the entry gate lock actuation system may be remotely enabled only in response to signals which originate from the using units.

According to one preferred embodiment of the subject invention, a telephone handset and dial unit is provided in a foyer area outside of an entry gate; and a directory, listing the respective codes assigned to each apartment unit, is located adjacent to the telephone handset and dial unit. A directory interface and dialing unit, which is responsive to code numbers dialed on the foyer telephone, retrieves the actual telephone number of the apartment corresponding to the dialed code number. If the called party answers and desires to allow access, a hand held tone generator is positioned next to the mouthpiece of the telephone in the apartment unit and is actuated to provide a tone of a preselected frequency. Logic circuits recognize tones within a range encompassing the preselected frequency which originates from the called apartment, and in response thereto actuate the release mechanism of the entry gate. A programing unit allows for the rapid loading and for checking of the digital memory; and during the programming mode the directory code number is used to address the memory location in which the associated apartment telephone number is stored.

In accordance with a second embodiment of the invention, the called party may authorize entry by depressing a preselected key button on a touch-tone type phone or by dialing a preselected digit on a dial type phone set. In this embodiment logic circuits respond to the plurality of tones associated with the preselected key button or to the number of pulses corresponding to the preselected digit and in response to either of these signals the release mechanism of the entry gate is actuated.

Security entry systems in accordance with the subject invention provide a simple, safe and efficient vocal identifications entry system. Workmen do not need to enter the user's apartment or office during installation, and no wires are run into the using units. The standard telephone (and the tone generator in one embodiment) in the using unit is the only instrument needed to speak to and identify visitors; and unlock the entry gate or lobby door. Consequently the system may be installed into any building quickly, usually by one installer in a single day — even in building consisting of hundreds of separate units. Also since the tenant must talk to the visitor on the telephone, the possibility of a tenant inadvertently authorizing entry to the wrong party is reduced; and the conversation between the visitor and tenant may take place in a normal tone of voice, as there is no need to shout into a grill or panel, as required by most intercom systems. A further advantage is that the security entry system may be operated from any room in which the tenant has access to the telephone. Another advantage of the subject invention is that the actual telephone number of the called apartment need not be listed so the tenant is assured of complete privacy and full protection.

The novel features of the invention are set forth with particularity in the appended claims. The invention will be best understood from the following description when read in conjunction with the accompanying drawings in which like reference characters refer to like parts.

DESCRIPTION OF THE PREFERRED EMBODIMENTS

Figure 1:
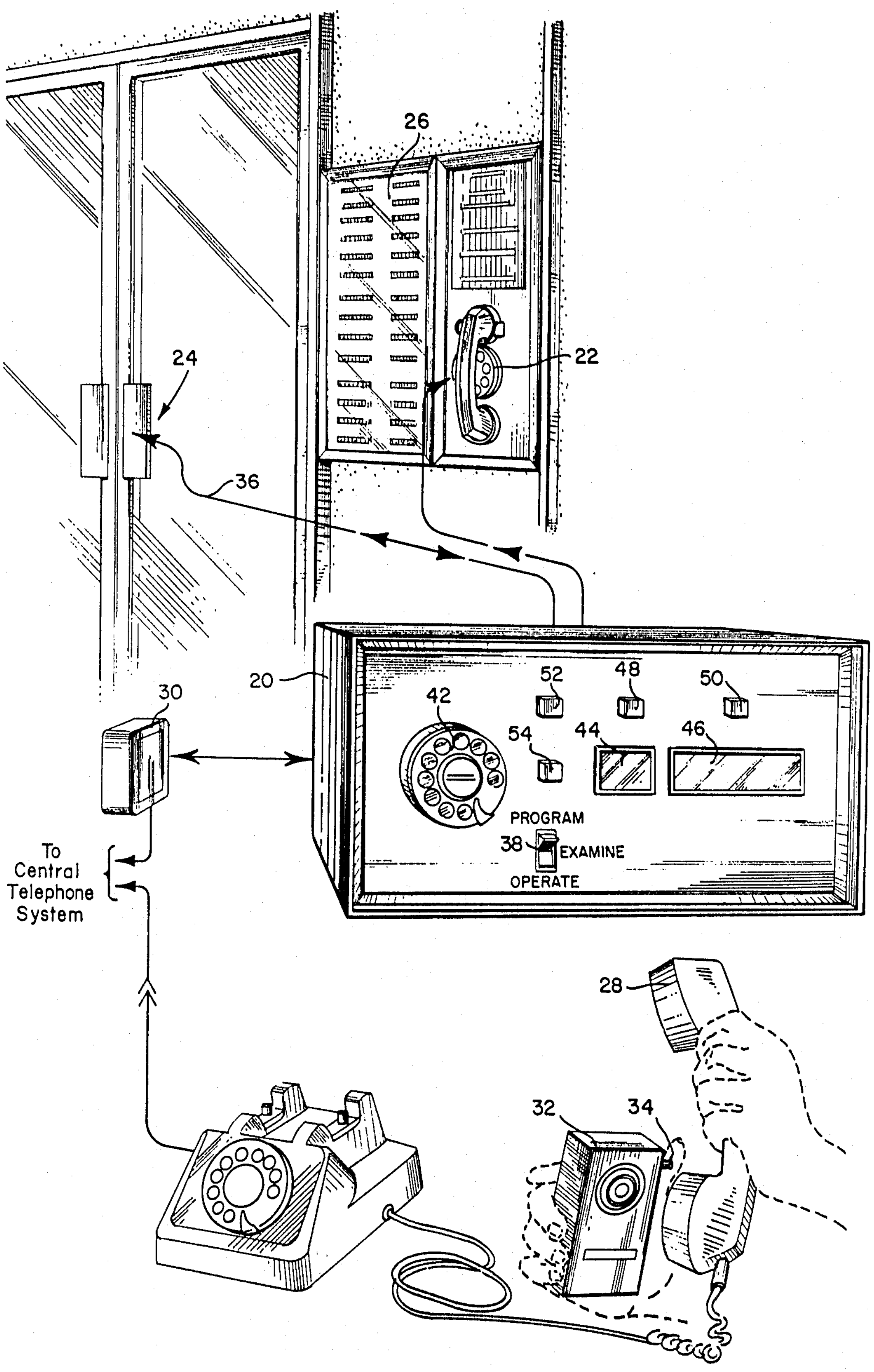
FIG. 1 depicts in pictorial and block diagram form the various units comprising or used in conjunction with one preferred embodiment of the subject invention.

Reference is first directed primarily to FIG. 1 which depicts in pictorial and block diagram form, the various units and/or assembling comprising, or used in conjunction with one preferred embodiment of the subject invention. As there shown, an entry control computer 20 is electrically connected to a telephone and dial unit 22 located at a foyer area outside of lobby doors 24 of an apartment complex. A directory 26 which lists a three digit code number for each apartment is located adjacent to the foyer phone.

In the Operate Mode of the system of FIG. 1, a party seeking entry dials the three digit code number of the selected apartment on the foyer phone, and in response thereto the computer 20 retrieves the actual telephone number of the selected apartment from a preprogrammed digital shift register memory, dials the telephone number and connects, via the switched telephone network (common carrier) the telephone 28 in the called apartment to the foyer phone. This connection is implemented through a telephone coupler 30 (optional) and the normal switched telephone network (central telephone system) and therefore no extra wiring or equipment is needed in the tenants' apartment. The tenants' own personal telephone and the tone generator are the only instruments needed to speak to and identify visitors; and to unlock lobby doors 24. Entry can be authorized by the tenant placing a tone generator 32 next to the telephone mouthpiece and depressing button 34, which triggers a sound impulse of a preselected frequency. In response to these tones, originating from the tenant's apartment, computer 20 applies an enable signal on a cable 36 to an electronic door lock (not shown in FIG. 1) for a preselected time period.

Entry control computer 20 and telephone coupler 30 could be located in a storage closet, for example; and the only installation required is the wiring from the computer to the foyer phone and to the lobby door lock. Telephone coupler 30 may be leased from the Telephone Company and could be Universal Service Order Code number SU6, manufactured for or by the Western Electric Company.

Computer 20 can be programmed by persons completely unfamiliar with electronics by the following simple procedure. First mode selector switch 38 on computer control panel 40 is positioned to the Program Mode and the code number and the corresponding telephone number of a given apartment are dialed on dial unit 42. In response to the resulting dial pulses, the code number and telephone number is displayed on digital readout display units 44 and 46, respectively; and "enter code number" and "enter telephone number" legends 48 and 50 are illuminated. If the displayed numbers are those which the programmer intended to dial, a confirm button 52 is depressed and the telephone number is stored at a memory address defined by the code number. The unit is then ready for programming the next set of code and telephone numbers. If the displayed numbers are not those which the programmer intended to dial, reject button 54 is depressed and the unit is cleared for a new programming sequence.

The memory content of computer 20 may be checked by placing mode selector 28 in the Examine Mode and dialing a desired code number; and the dialed code number and the corresponding stored telephone number are digitally displayed on units 44 and 46, respectively.

Figure 2:
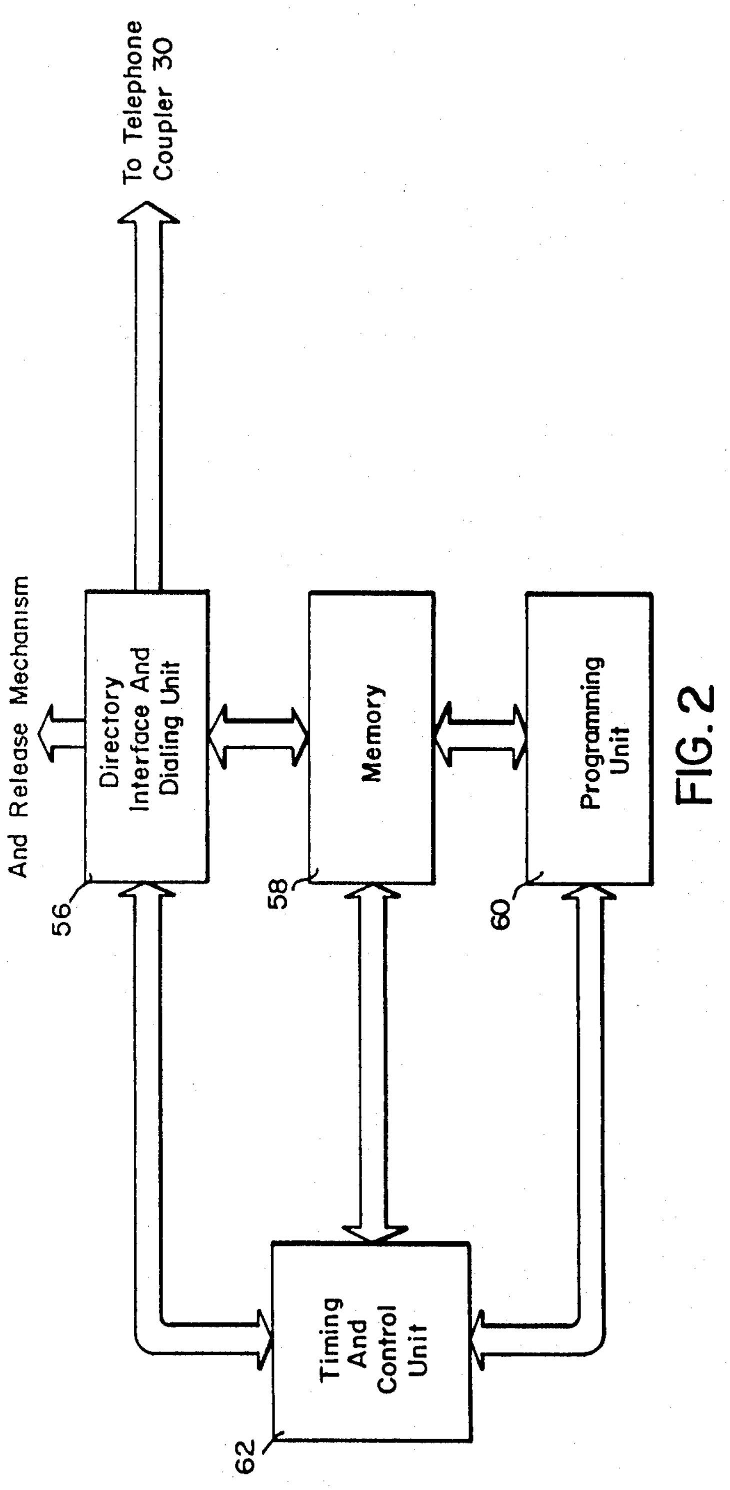
FIG. 2 is a block diagram of the entry control computer shown in FIG. 1.

A functional block diagram of entry control computer 20 is shown in FIG. 2, to which reference is now primarily directed. In response to the code number dialed on foyer phone 22 (FIG. 1) interface and dialing unit 56 retrieves the telephone number of the called apartment from a digital memory unit 58; dials the retrieved telephone number; connects, via the switched telephone network, the foyer phone to the apartment phone; and enables the lobby door lock, if entry is authorized. Programming unit 60 allows for preprogramming memory 58 so that the correct phone number of a given apartment is stored in an address location corresponding to the associated code number; and timing and control unit 62 provides the required synchronization and timing signals to units 56, 58 and 60.

Before proceeding with a detailed description of the circuits comprising computer 20, the symbology used in the drawings will be defined as outlined below. The symbology adopted herein is in accordance with the generally employed in the art.

Figure 3:
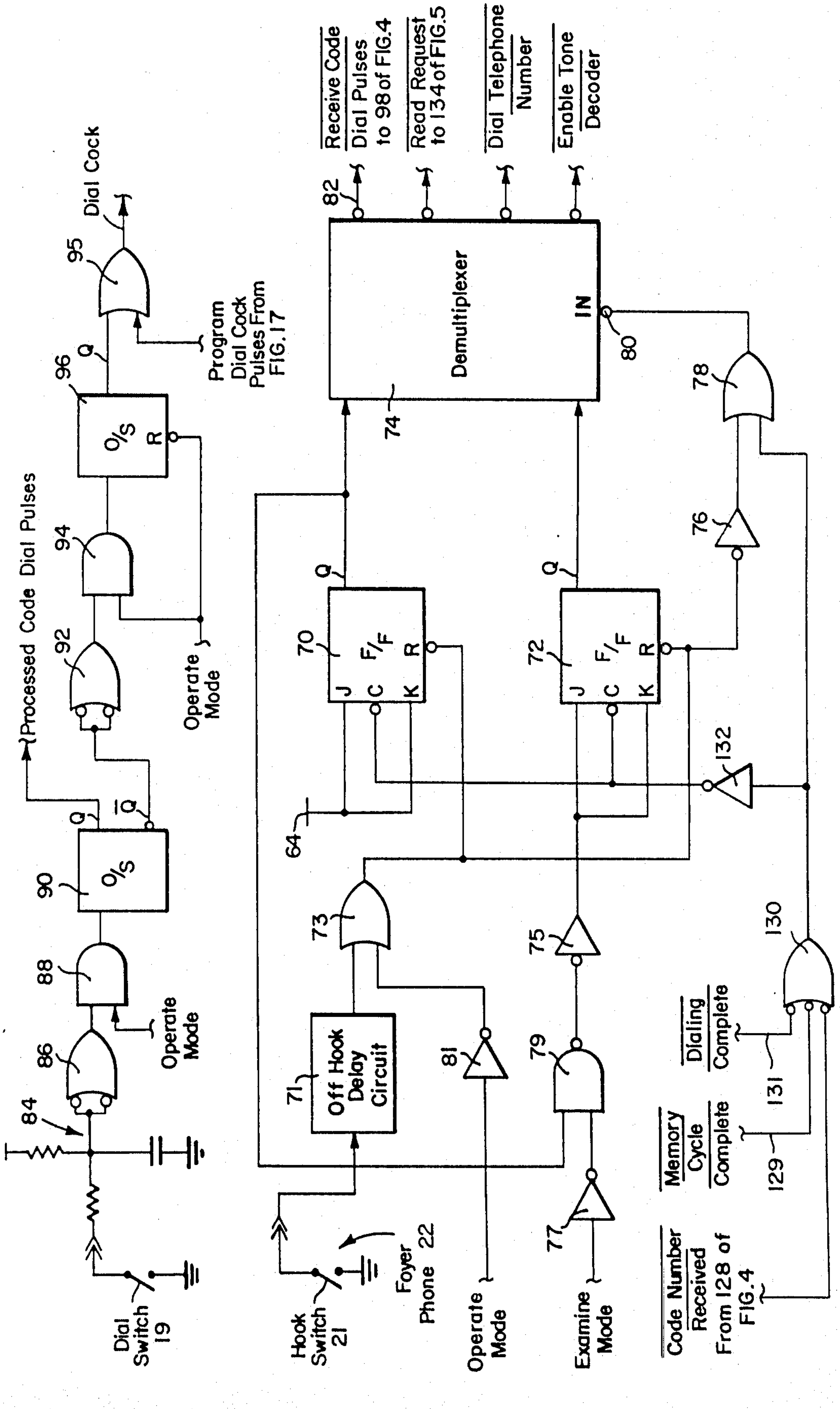
FIG. 3 is a schematic and block diagram of the portion of the entry control computer which controls the operational states of the system.

A horizontal line terminating a lead, such as referenced by numeral 64 in FIG. 3, is indicative of a DC voltage supply, such as 5v DC source, for example.

A logic gate symbol having a pointed front section and a curved rear section such as referenced by number 78 of FIG. 3, is indicative of an "OR" type function.

An "AND" type function is indicated by a gate symbol having a blunt front section and a straight rear section, such as gate 88 of FIG. 3.

A small circle at the input or output terminal of a logic element indicates that the applied signal is "logically" inverted in being processed therethrough.

The notation O/S (one shot) stands for a monostable multivibrator; and a small circle at an output terminal thereof indicates that the output signal from the terminal is low during the pulse time, and high at other times.

The notation F/F (flip-flop) stands for a bistable multivibrator; the output terminal without a small circle (Q output) is "high" when the flip-flop is set; and the output terminal with a small circle ($\overline{Q}$ output) is "low" when the flip-flop is set.

The notation "C" indicates a clock type signal input terminal; and the symbol "R" indicates a disable, clear or reset type input terminal. A small circle at an "R" terminal, for example, indicates that the disable, clear or reset function is enabled by a "low" signal.

A "high" signal may be considered a positive voltage, such as 5v DC, for example. A "low" signal may be considered a zero potential (ground level) signal.

A four or five digit number such as "74121" used in association with a given circuit refers to the identification number of the integrated assembly generally assigned by integrated circuit manufacturers such as Fairchild Instruments, Inc., Texas Instruments, Inc., Signetics, Inc., the National Semiconductor Corporation, Motorola Semiconductor products, Inc., or the INTEL Corporation. However it will be understood that such identification numbers are given only by way of example, and suitable substitutes may be readily selected by those skilled in the art.

Figure 4:
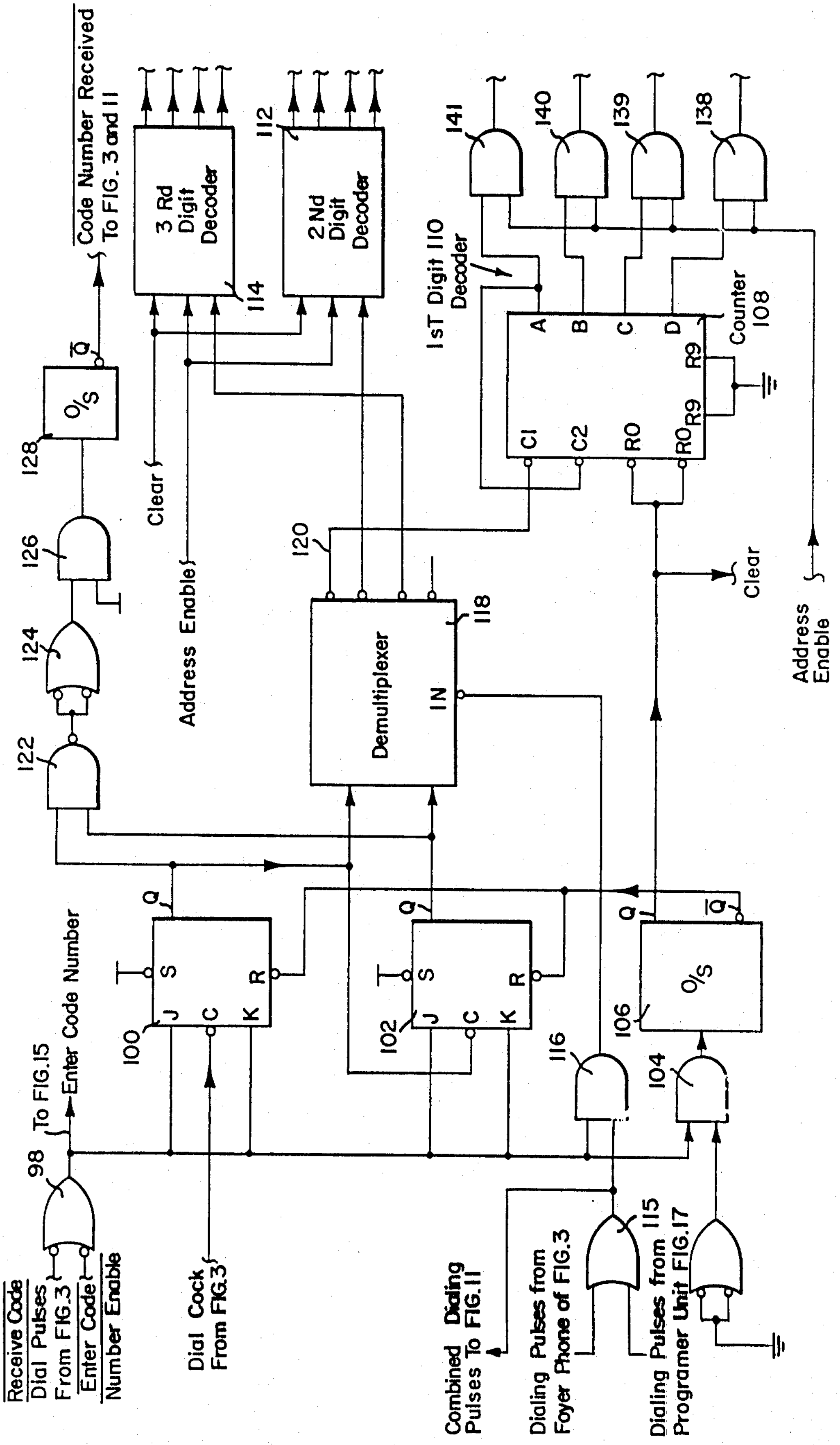
FIG. 4 is a schematic and block diagram of the portion of the entry control computer which converts the code number to the correct format for addressing the digital memory portion of the computer.

Reference is now primarily directed to FIGS. 3 and 4 which show the circuits for converting the code number dialed on the foyer phone to the correct format for addressing memory 58 (FIG. 2); and which control the sequencing steps (various operational states) of computer 20.

As shown in FIG. 3, flip-flops 70 and 72 are connected in a counter arrangement (0 through 3) for controlling a demultiplexer 74 such that the output signals therefrom are indicative of the four operational states of computer 20. Flip-flops 70 and 72 each may be one section of a dual integrated flip-flop circuit such as type 7473; and demultiplexer 74 could be one section of dual integrated circuit type 4007. When foyer phone 22 is "on hook" (hung up) hook switch 21 is closed, flip-flops 70 and 72 are reset, and a zero count is applied to demultiplexer 74. When the hand set of the foyer phone is subsequently picked up the "off hook" signal from switch hook unit 21 is processed by off hook delay circuit 71, OR gate 73, inverter (inverting amplifier) 76 and OR gate 78 so as to enable input terminal 80 of demultiplexer 74; and thereby produce an output signal at terminal 82 indicative of the first operational state, which is "receive code dial pulses". Off hook delay circuit 71 will be described hereinafter relative to FIG. 8. It is noted that the small circle at the input of inverter 76 indicates that for a high signal (off hook) input, a low output signal is provided. Similarly the small circles at input terminal 80 and the output terminals of the demultiplexer indicate that the demultiplexer is enabled by a low signal, and that when enabled a low signal is applied to a selected one of its outputs. The count applied from flip-flops 70 and 72 determines which output terminal is selected.

As also shown in FIG. 3, code dial pulses from normally open dial switch 19 of foyer phone 22 are processed by an input circuit 84, gates 86 and 88, and O/S 90 to provide processed code dial pulses at the Q output terminal of O/S 90. The purpose of the just referenced circuitry is to "clean up" the dial pulses, and the time constant of O/S 90, which may be a 74121 type circuit, is selected to correspond to the proper dial pulse width, such as 61 milliseconds. The output signal from the $\overline{Q}$ output of O/S 90 is processed by gates 92 and 94 and O/S 96 to produce a "code dial cock pulse" at the output of O/S 96. The purpose of this circuit is to produce a pulse corresponding to the dialing period of each code number digit and the time constant of O/S 96 which may be a 74122 type, is selected accordingly. It is noted that AND gates 88 and 94 are "interlocked" by an "Operate Mode" signal which originates from the setting of mode switch 38 (FIG. 1); and the electrical source of this signal, as well as similar control signals will be described hereinafter.

Referring now primarily to FIG. 4, the "$\overline{\text{receive code dial pulses}}$" (first operational state) signal from demultiplexer 74 is applied to one input of an OR type gate 98. It is noted that in the first operational state the "$\overline{\text{receive code dial pulses}}$" signal is low, and it is inverted at the input of gate 98 (indicated by small circle) to produce a high signal at the J and K inputs of flip-flops 100 and 102, which may be circuit type 7476. These flip-flops are arranged to count the trailing edges of the dial cock pulses applied from an OR gate 95 of FIG. 3.

The output from gate 98 also is applied through AND gate 104 to trigger an O/S 106 which may be a 74121. The Q output from O/S 106 is applied as a reset signal to a counter 108 of a first digit decoder 110 as well as to similar counters (not shown) in a second digit decoder 112 and a third digit decoder 114. These counters may be 7490 type circuits. The $\overline{Q}$ output from O/S 106 is applied so as to reset flip-flops 100 and 102.

The processed dial pulses from O/S 90 of FIG. 3 are applied through gates 115 and 116 to the input terminal of a demultiplexer 118. During the first dial cock pulse period flip-flops 100 and 102 indicate a count of zero, and in response to that count demultiplexer 118 routes the applied dial pulses to its first output terminal 120. The dial pulses for the first digit of the code number are routed from output terminal 120 to one of the clock input terminals of counter 108, which counts these dial pulses and provides a four bit binary output signal indicative thereof.

Similarly, during the second and third dial cock periods, the code dial pulses are routed to second digit and third digit decoders 112 and 114 respectively. These circuits, which may be identical to circuit 110, provide binary output signals indicative of the second and third digits of the code number. It is noted that the fourth output terminal of demultiplexer 118 is not used.

Upon the trailing edge of the third code dial cock pulse, flip-flops 100 and 102 indicate a count of three, which is sensed by gates 122, 124 and 126 to provide a trigger pulse to an O/S 128. The $\overline{Q}$ output signal from O/S 128 ("$\overline{\text{code number received}}$") is applied through gate 130 and inverter 132 of FIG. 3 so as to cause the state counter (flip-flops 70 and 72 and demultiplexer 82) to increment to the second state which is, "$\overline{\text{read request}}$". The output signal from gate 130 is applied through OR gate 78 and temporarily disables demultiplexer 74 during the pulse time of O/S 128. This is to avoid ambiguities in operation during the switching time of demultiplexer 74.

The "$\overline{\text{read request}}$" signal from demultiplexer 74 is applied to one data input ($D_2$) of a dual latch circuit 134 (FIG. 5), which may be a 7474 type integrated circuit assembly, for example. In response to the "$\overline{\text{read request}}$" signal, which is a "low" signal, the $Q_2$ output of latch circuit 134 is also low; and this enables gate 136 which produces an "address enable" signal at its output.

The "address enable" signal is applied to one input of AND gates 138 through 141 (FIG. 4) and the other input of each of these gates is coupled to respective output terminals of counter 108 of first digit decoder 110. It will be recalled that the signals at the output terminal of counter 108 represent, in a four bit binary format, the first digit of the code number dialed on the foyer phone. The "address enable" signal is also applied to similar output AND gates (not shown) in second digit decoder 112 and third digit decoder 114. Hence, in response to the address enable signal the three digit code number, in a 12 parallel bit binary format, is gated to the output leads of decoder 110, 112 and 114. The signals on these twelve leads, designated "code address", are applied on a cable 142 to a comparator 144 of FIG. 5.

Figure 5:
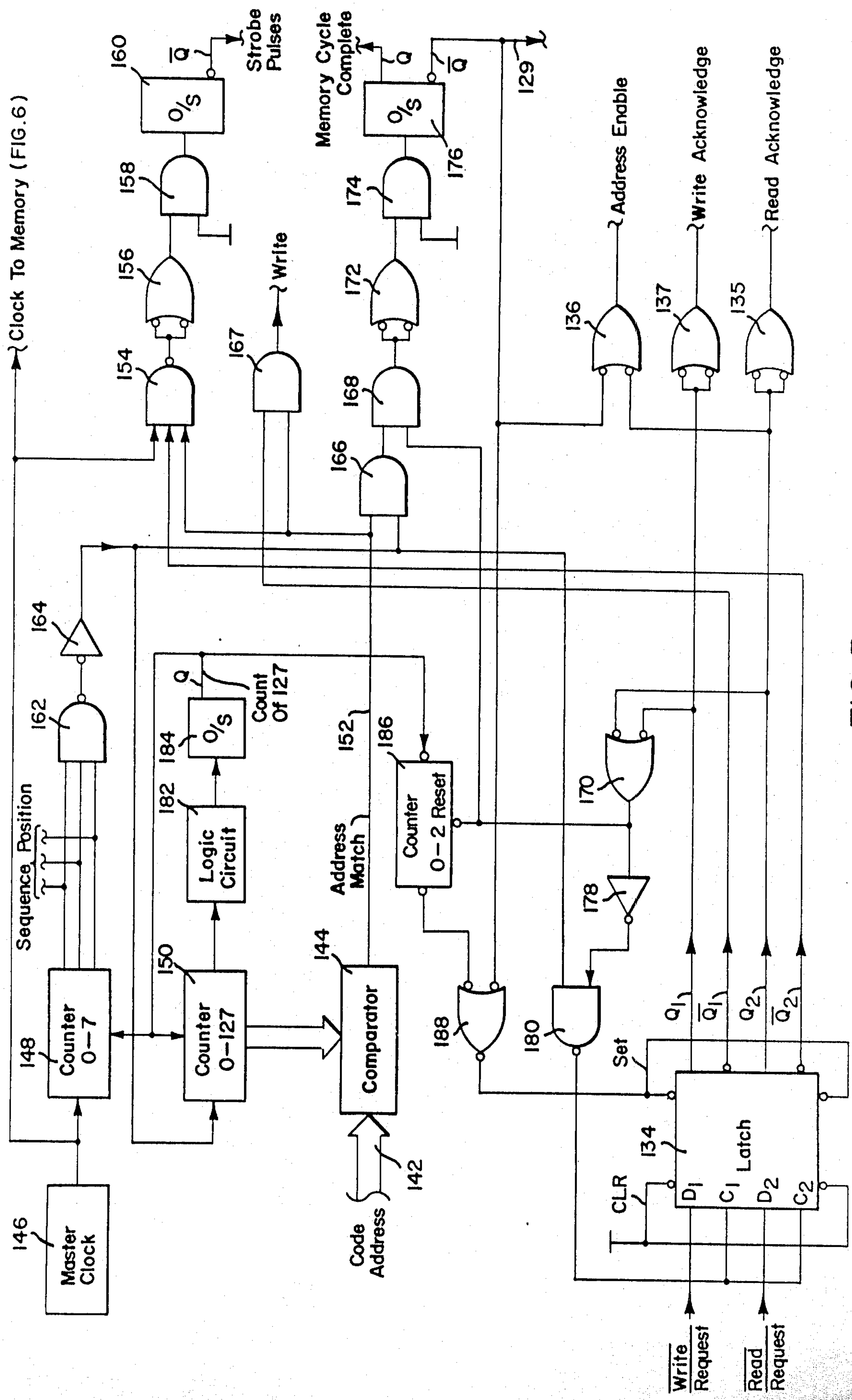
FIG. 5 is a schematic and block diagram of timing and synchronization circuits of the entry control computer.

Referring now primarily to FIG. 5, a master digital clock circuit 146 applies clock pulses to a counter 148. Counter 148 is a "count of eight unit" (0 to 7 and repeat) and is used for synchronism of the eight clock pulse long memory sequence of the illustrated embodiment. A counter 150 is a "count of 128 (0 to 127 and repeat) unit" and is used to control the addressing of the memory. The count of seven in counter 148 is sensed by gate 162 to produce an output from inverter 164 which drives counter 150.

When the count in counter 150 coincides with the "code address", comparator 144 produces an "address match" signal on an output lead 152.

The "address match" signal, clock pulses and a signal from the $\overline{Q}_2$ output of latch 134 are applied to the input terminals of a gate 154. The output signal from the $\overline{Q}_2$ terminal of latch 134 is high during the "$\overline{\text{read request}}$" operational state, and so during the "address match" period the output from gate 154 is low during clock pulse periods. The output from gate 154 is applied through gates 156 and 158 to a trigger input terminal of a O/S circuit 160. The output signals from O/S 160, designated "strobe pulses", are used to strobe the data from the digital shift register memory unit into output demultiplexer and latch circuits.

The outputs from "0 to 7 counter" 148 are processed by gate 162 and inverter 164 to produce a high signal at the start of each eighth clock pulse, i.e. each time counter 148 holds a count of seven. As explained below, the output signals from inverter 164 are used to control other circuits of FIG. 5 for synchronism with the memory operation.

The output signal from inverter 164 is applied to one input of an AND gate 166 and the "address match" signal is applied to the other input thereof. Hence at the start of the next eight clock pulse sequence following an address match, the output of gate 166 goes high. The output signal from gate 166 is applied to an AND gate 168, as is a signal from the output of a gate 170 which is high during the "$\overline{\text{read request}}$" or "$\overline{\text{write request}}$" operating state. The output from gate 172 is processed by gate 174 and applied to an O/S 176 which produces a memory cycle complete pulse. The duration of the output pulse from O/S 176 is such that the memory read or write operations may be completed during the pulse time.

The output signal from gate 170, is inverted in an inverter 178 and applied as one input to a gate 180; and the output from inverter 164 is applied as the second input to gate 180. Gate 180 interlocks latch 134 so that the state thereof may not change at the beginning of a memory sequence. The $\overline{Q}$ output signal from O/S 176 clears latch circuit 134 (through gate 188); and provides for the continuation of the address enable signal (through gate 136) during the pulse time of O/S 176.

In the illustrated embodiment, the entire memory rotation is 128 X 8 clock periods long and logic circuit 182 is coupled to counter 150 so as to sense the count off 127, and in response thereto provides a trigger pulse to an O/S 184 which produces an output pulse at the end of each memory rotation. The output signal from O/S 184 is applied to reset counters 148 and 150 and as an input signal to a counter 186. Counter 186 is configured to count memory rotations; and on the count of two, counter 186 produces a low output signal to a gate circuit 188. When enabled gate 188 produces a low output signal which clears latch circuit 134. The purpose of the just described circuitry associated with counter 186 is to insure the future operation of the system if the code address applied to comparator 144 does not match any memory address, such as could occur if certain nonavailable code numbers were dialed on the foyer phone. Counter 186 is held at a reset state between read or write operations by the output of gate 170; and so a count of two therein is indicative of at least one complete memory rotation having occurred during any given read or write operation.

Figure 6:
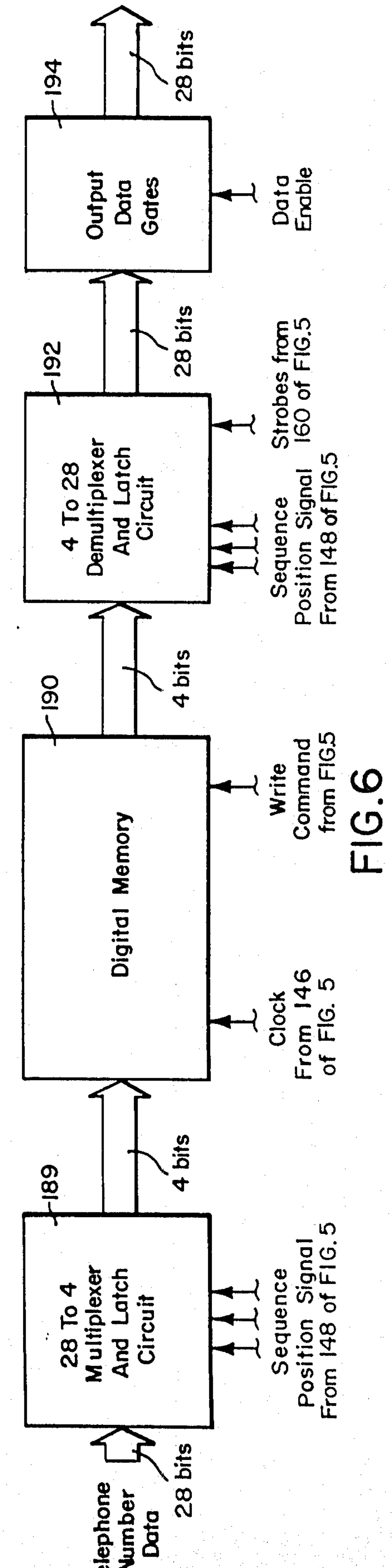
FIG. 6 is a block diagram of the digital memory portion of the entry control computer.

Referring now primarily to FIG. 6, memory unit 190 may consist of two integrated circuits of the 2401 type; with each unit comprising two 1024 stage shift registers connected in a conventional digital shift register memory configuration, and synchronized by clock pulses applied from master clock 146 of FIG. 5. It will be assumed for the present that each of the actual telephone numbers for the various apartment units have been programmed into unit 190 at respective addresses corresponding to the code numbers of the apartments. The circuitry for programming these telephone numbers into unit 190 will be explained in detail hereinafter.

The four parallel output bits for unit 190 are applied to the input of a 4 to 28 demultiplexer and latch 192, which may be implemented from four 9334 units with four of the eight outputs from one unit not being used. Demultiplexer and latch 192 is controlled in response to the memory sequence position signals from counter 148 of FIG. 5. In response to the output strobe pulses from O/S 160 of FIG. 5, unit 192 samples and stores the four parallel output bits from memory unit 190 during eight strobe periods. 28 of the 32 output terminals of demultiplexer and latch 192 (four outputs not used) are coupled in parallel to output data gates 194. Data gates 194 may comprise 28 AND gates with one input of each gate coupled to a respective output terminal of demultiplexer 192, and the other input to each gate being a data enable signal. The twenty-eight outputs from gates 194 represent seven groups of four bits each, with each group defining a particular digit of a seven digit telephone number.

Referring back to FIGS. 3 and 5, the $\overline{Q}$ output pulse (a low signal) from O/S 176 of FIG. 5 is applied on a lead 129 to gate 130 (FIG. 3) so as to apply a high output pulse to inverter 132. This in turn increments the counter (flip-flops 70 and 72) controlling demultiplexer 74. Following the memory read cycle the output from gate 130 goes low and terminal 80 of demultiplexer 74 is again enabled and the system is switched to the third operational state which is "$\overline{\text{dial telephone number}}$".

Figure 7:
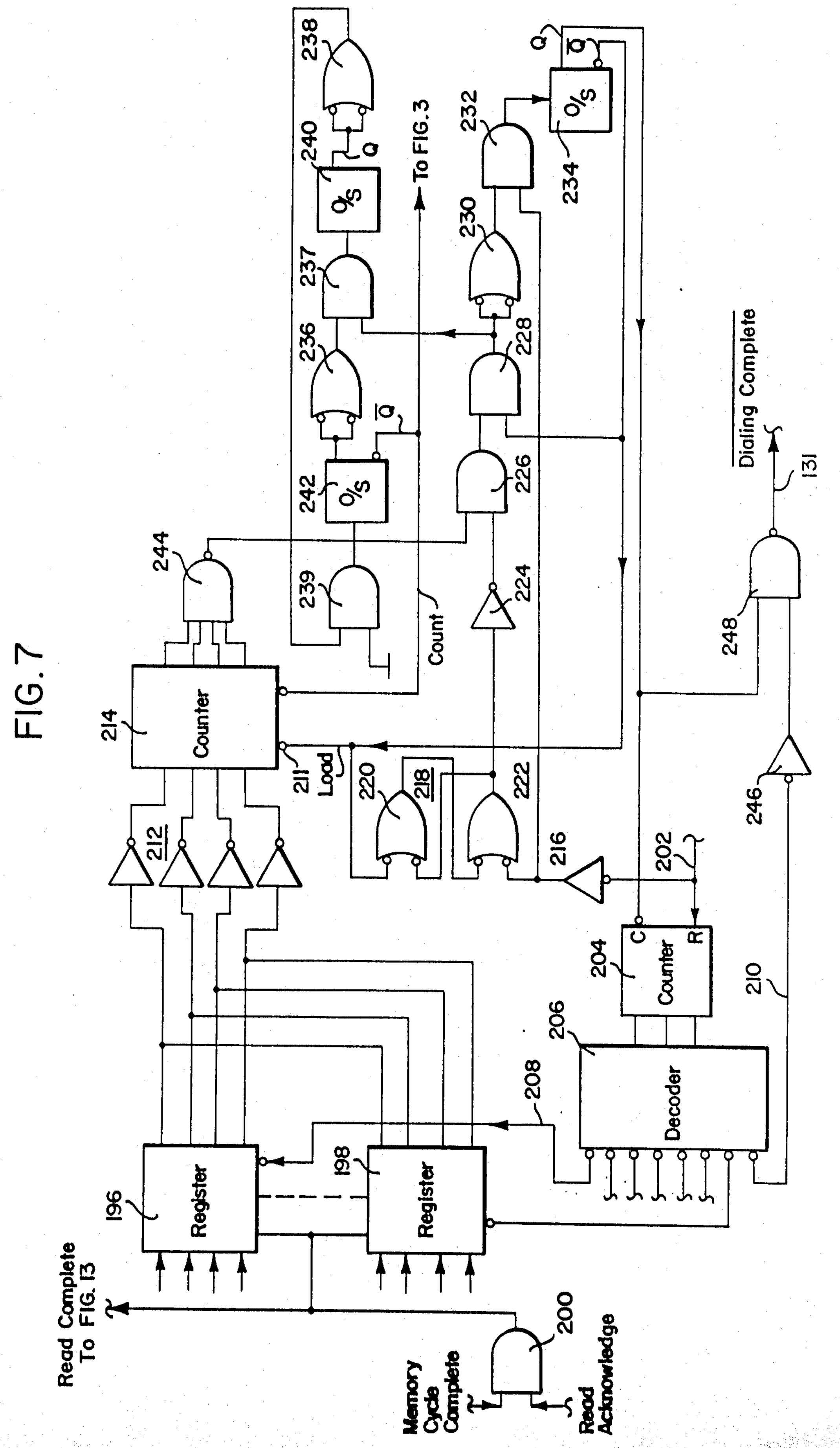
FIG. 7 is a schematic and block diagram of the entry control computer circuitry which produces dial pulses of the preprogrammed telephone number which corresponds to a given code number.

Referring now primarily to FIG. 7, four parallel bits for each of the seven telephone numbers are applied from the output data gates (FIG. 6) to the temporary storage registers of FIG. 7; which may be seven 8551 circuits. Two such registers 196 and 198 are shown in FIG. 7 for storing the four data bits for the first and seventh digits, respectively, of the telephone number. However, it will be understood that five other similar registers are used and their operation will be apparent from the description of the two shown.

The telephone number data is loaded into the storage registers in response to a high output signal from an AND gate 200, which has the "read acknowledge" and "memory cycle complete" signals from elements 135 and 176, respectively, of FIG. 5 applied as input signals thereto.

The third operational state signal "$\overline{\text{dial telephone number}}$" (a low signal) is applied from demultiplexer 74 (FIG. 3) on input lead 202 of FIG. 7. The reset terminal of a counter 204, which may be a 7493 circuit is coupled to the lead 202, and the counter is reset prior to the application of the third operational state signal by the high signal on lead 202; so that at the start of the third operational state the counter holds a count of zero. Three of the four output leads from counter 204 (a fourth output not used) are coupled to a decoder circuit 206 which may be a 7442 type integrated circuit. In response to the count of counter 204, decoder 206 applies an output signal (low) to one output lead. For example, on the count of zero an enable signal (low) is applied to lead 208 and on the count of seven to lead 210.

Corresponding ones of each of the four respective output bit leads from the storage registers (196, 198 and five not shown) are coupled in parallel, and the data which is "gated out" is determined by which register is enabled by a signal from decoder 206. For example on the count of zero in counter 204 the output from register 196 is enabled and the data there stored is coupled through inverters (indicated generally by reference number 212) to data inputs of a counter circuit 214. It is noted that due to the inverters the data applied to counter circuit 214 is the complement of the data held in the storage registers. Counter circuit 214 may be a 8281 type circuit.

The third operational state signal on lead 202 is applied through an inverter 216 to one input of a flip-flop type circuit 218, which comprises gates 220 and 222. The output from gate 222 is coupled through inverter 224 to an AND gate 226. In response to the third operational state signal the output of gate 232 goes high and triggers a O/S 234. O/S 234 has a time constant equal to the time between dialing pulse bursts, in accordance with the specifications of the telephone system, such as 600 milliseconds for example.

The $\overline{Q}$ output from O/S 234 enables the load input terminal 211 of counter 214, and the data from inverter 212 is then loaded into the counter. The $\overline{Q}$ output from O/S 234 is also applied to gate 220 and thereby sets circuit 218, which then provides a low signal to inverter 224. The output signal from inverter 224 is processed by gates 226 and 228 so as to enable the dialing operation. The purpose of circuit 218 is to inhibit the dialing operation until the first telephone number digit has been loaded into counter 214.

Gates 236 through 239 and O/S circuits 240 and 242 are coupled to produce pulses at the output of O/S 242 during the time the output from gate 238 is high. The pulse times of O/S circuits 240 and 242 are selected to provide pulse widths and interpulse spacing according to the specifications of the telephone system, such as 61 millisecond pulses with 39 milliseconds between pulses, for example.

The $\overline{Q}$ output signals from O/S 242 are applied to the count input of counter 214 and the counter is incremented each input pulse until its outputs are high (binary 15). This output state of counter 214 is sensed by an AND gate 244, which then produces a low output; which causes the output from gates 226 and 228 to go low; thereby stopping the dialing operation (production of dial output pulses) of the circuitry associated with O/S 242. It is noted that since counter 214 was initialized with complementary data, the "binary 15" state occurs when the number of dial pulses counted equals the value of the data applied to inverters 212. For example, if a binary four is applied to inverters 212, counter 214 will be loaded with its binary complement (eleven) and the counter will hold a count of 15 after four dial pulses from O/S 242.

When the output of AND gate 228 goes low it produces a second triggering of O/S 234 which produces the interdigital delay period (such as 600 milliseconds). On the trailing edge of the Q output signal from O/S 234 counter 204 is incremented to the second count and the second storage register (not shown) is enabled so that data stored therein is applied through inverters 212 to counter 214. The $\overline{Q}$ output from O/S 234 enables the load input terminal 211 of counter 214. The dial pulses for the second telephone digit are then produced in the same manner as described above for the first digit.

The above operating sequence continues until the seventh digit has been dialed; and counter 204 is then incremented to the count of seven, thereby enabling the eight output lead 210 of decoder 206. This enable signal is applied through inverter 246 to an AND gate 248; and on the following triggering of O/S 234 the output from AND gate 248 goes low indicating "$\overline{\text{dialing complete}}$".

Referring momentarily to FIG. 3, the "dialing complete" pulse is applied to gate 130 on a lead 131 and in response thereto demultiplexer 74 switches to the last operational state of "enable tone decoder". It is noted that this last operational state provides an interlock signal for additional security against unauthorized entry, and need not be used for installation where not appropriate.

Figure 8:
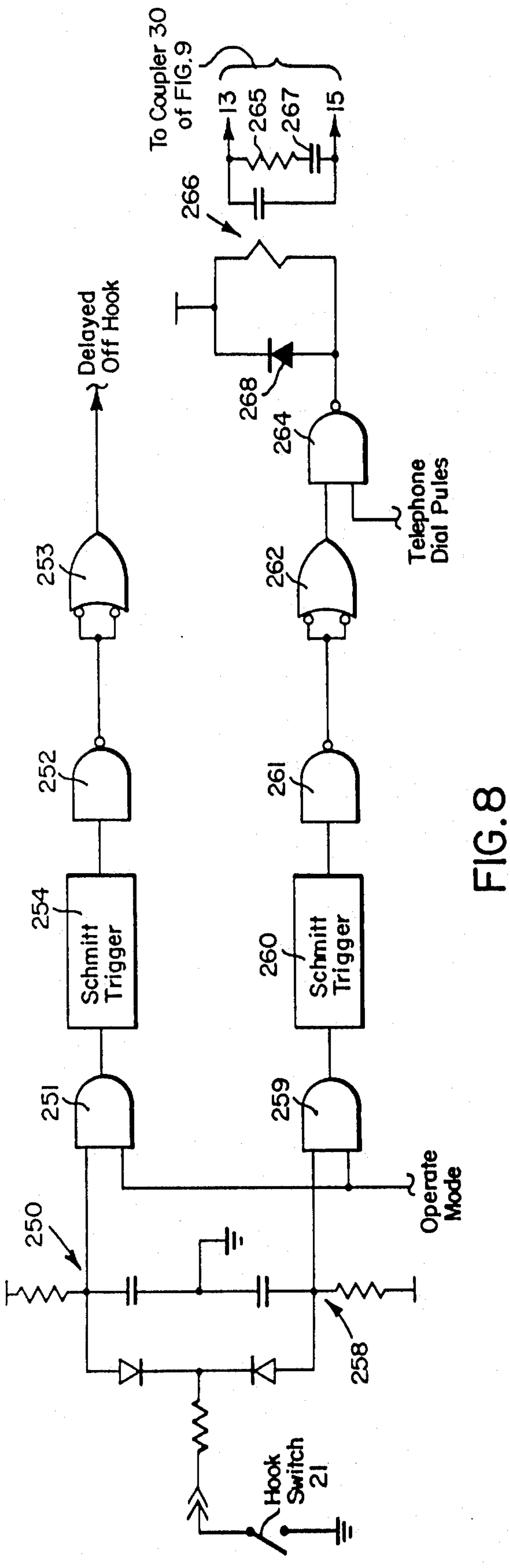

Continuing with the description of the Operate Mode of the system, reference is now directed to FIG. 8 which shows the interface between the telephone system coupler and the dial circuits of FIG. 7. As shown in FIG. 8, hook switch 21 of foyer phone 22 (same as shown in FIG. 3) is coupled through a first input circuit 250 to circuitry comprising gates 251, 252 and 253 and Schmitt trigger circuit 254. When the foyer phone is off hook the ground is removed from junction point 256 and the just mentioned circuits (unit 71 of FIG. 3) produce a high output signal at gate 253 after a preselected delay, such as one second, for example. This off hook delay is provided to avoid the effects of noise on the line when the telephone coupler "comes on line".

Circuits 258 through 262 produce a similar "off hook" signal at the output of gate 262, except the time delay is shorter, such as one-half second, for example. This delay prevents the dialing of a telephone number by tapping on switch hook 21 of the foyer phone.

Figure 9:
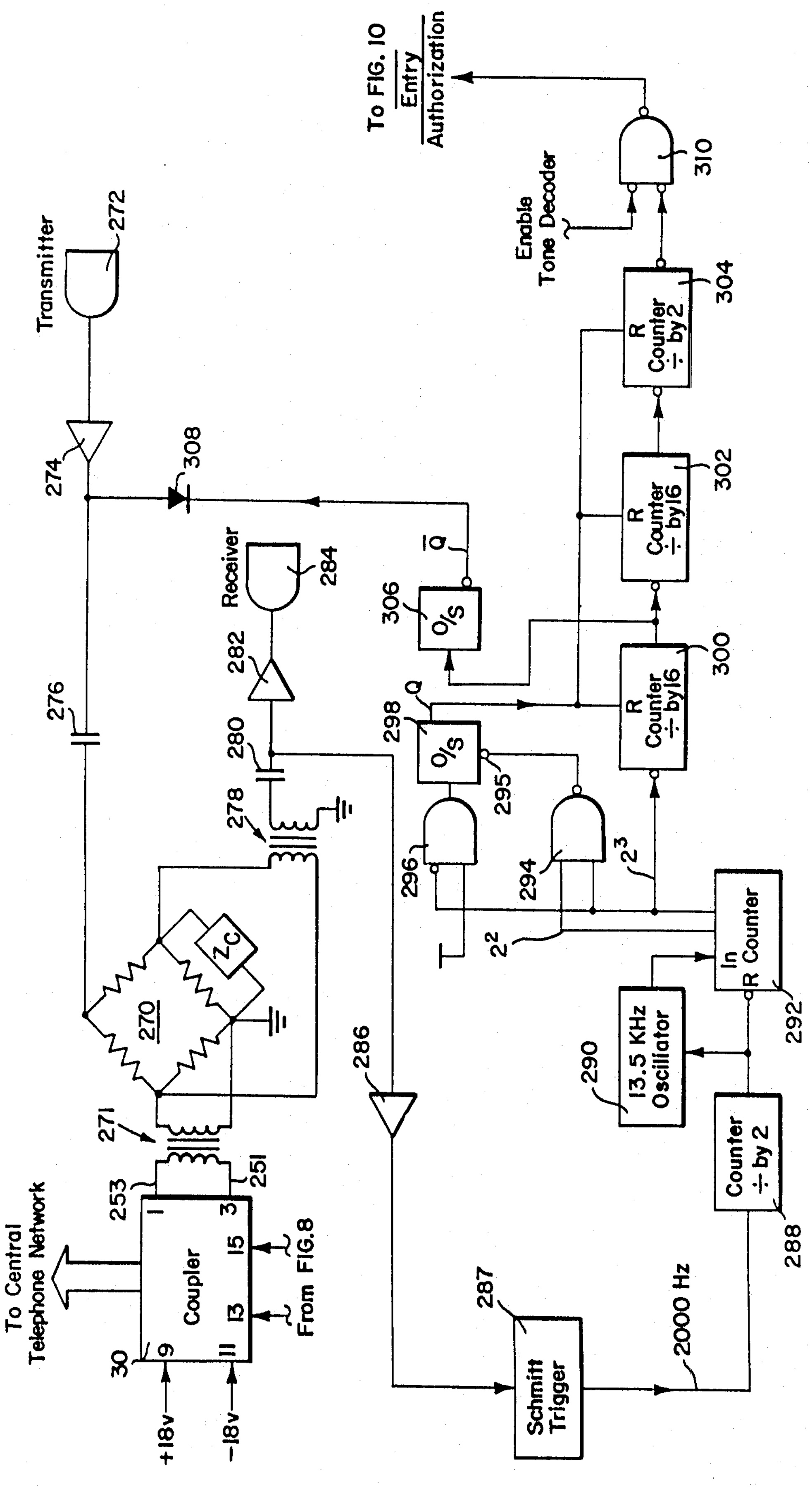
FIGS. 8, 9, and 10 are schematic and block diagrams of circuitry for interfacing between the foyer phone and the entry control computer, and for enabling the lobby door lock mechanism in response to an authorization tone.

The output from gate 262 is applied to one input of an AND gate 264; and the other input to gate 264 is coupled to the $\overline{Q}$ output of O/S 242 of FIG. 7. The $\overline{Q}$ output from O/S 242 is normally high so the output from gate 264 is normally low when the delay off hook signal is applied from gate 262. The low output from 264 energizes a relay 266 coupled across terminals 13 and 15 of telephone coupler 30 (FIGS. 1 and 9). A diode 268 prevents damage to gate 264 due to reverse voltage spikes resulting from the collapsing magnetic field of the relay coil when the relay is deenergized. A resistor 265 and a capacitor 267 prevent arcing of the contacts of relay 266.

The telephone dial pulses from O/S 242 of FIG. 7 are coupled to AND gate 264 and are effective to pulse relay 266 to provide dial signals to the coupler, and from there to the switched telephone network (central telephone system).

Referring now to FIG. 9, in response to the dial pulses applied at terminals 13 and 15, coupler 30 operates in a conventional manner to connect telephone 28 (FIG. 1) of the called apartment unit to terminals 1 and 3 of the coupler, which terminals are connected through a transformer 271 across one arm of a bridge circuit 270. The capacitive impedance Zc is provide across an adjacent arm of the bridge to compensate for the capacitive load of the coupler. The transmitter element 272 of foyer phone 22 is coupled through an amplifier 274 and a capacitor 276 to the upper junction point of bridge 270, and the primary of a transformer 278 is coupled across the center two junction points of the bridge. The secondary of transformer 278 is coupled through a capacitor 280 and an amplifier 282 to receiver element 284 of foyer telephone 22. One purpose of the bridge circuit 270 is to transmit signals from transmitter 272 to the coupler; and to apply signals from the coupler to the secondary of transformer 280, without allowing significant signals from transmitter 272 to be applied to the receiving circuits. It is noted that coupler 30 may be eliminated if the Telephone company regulations so allow; in which case terminal 251 of transformer 271 (FIG. 9) would be connected to terminal 13 (FIG. 8) and terminals 253 and 15 (FIGS. 9 and 8, respectively) would be connected to the telephone lines.

As explained relative to FIG. 1, if the called party after talking to the person at the foyer phone, desires to authorize entry, he positions tone generator 34 next to the mouthpiece of handset 28 and enables the generator. The resulting tone which may be at 2,000 Hz for example, is coupled through the phone system and coupler 30 to the secondary of transformer 278 (FIG. 9).

High gain amplifier 286 and Schmitt trigger 287 convert the sign wave tone signal to square waves, and counter 288 divides the signal by two, to 1,000 Hz, for example. The positive (high) half cycles of the output signals from counter 288 enable an oscillator 290, which may have a frequency of 27 KHz, for example; and the output from oscillator 290 is applied to input signals to a counter 292. Counter 292 is reset by the "low" half cycles of the signals from counter 288.

The four and eight count output signals from counter 292 are applied to gates 294 and 296. The output signals from these gates are applied to a O/S 298 such that its trigger input is enabled on counts 8 through 11; and its prevent trigger input 295 is activated on counts 12 through 15. When input terminal 295 is activated (by a low signal) the O/S is inhibited from firing. The output from O/S 298 is applied to the reset input terminals of count down by 16 counter 300; count down by 16 counter 302 and count down by 2 counter 304.

The count of eight output signal from counter 292 is applied to the input of counter 300 and the output therefrom is applied to the input of counter 302 and to O/S 306.

In the operation of the just described logic circuit, if the frequency of the tone is not within a selected range, counters 300, 302 and 304 will be reset before an "authorization signal" can be produced thereby. For example, if 0–7 pulses are produced by oscillator 290 during the positive half cycle of the output signal from counter 288, no input will be applied to counter 300. It should be here noted that O/S 298 is enabled on the trailing edge of eight count pulse applied thereto, and that counters 300, 302 and 304 are incremented on the trailing edge of signals applied to their input terminals. If 8–11 pulses are produced by oscillator 290 during the positive half cycle of the output from oscillator 288, counter 300 increments one count, but is subsequently reset by O/S 298; if 12–15 pulses are produced counter 300 is incremented and O/S 298 is "held off"; and if more than 15 pulses occur the counters are incremented but are subsequently reset by O/S 298. Hence only a tone frequency which results in 12–15 pulses per cycle to counter 292 is effective to allow the counter chain to count to the point where an output is produced by counter 304.

As an additional safety feature the $\overline{Q}$ output from O/S 306 (a low signal) is coupled through diode 308 to disable transmitter 272 so that a tone from the foyer phone cannot be effective to operate counters 302 and 304. As a further safety precaution, the output from counter 304 is ANDed with the enable tone decoder signal applied from demultiplexer 74 to gate 310. The output from gate 310 is the "entry authorization" signal which is applied to the lock control circuit of FIG. 10.

Figure 10:
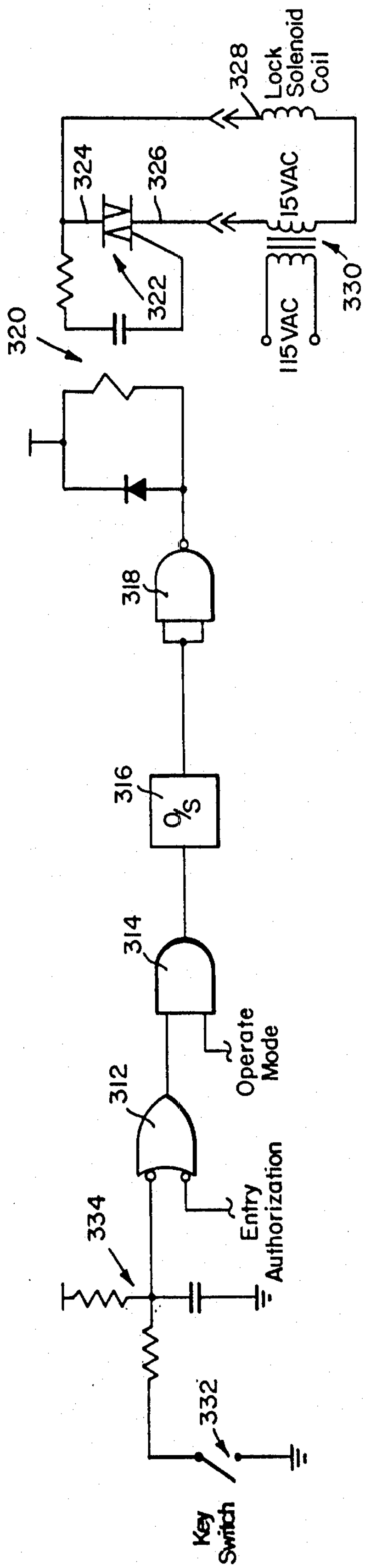

The lock control circuit for lobby doors 24 is shown in FIG. 10 to which reference is now directed. The "entry authorization" signal from gate 310 of FIG. 9 is applied to a gate 312 of FIG. 10 and the output therefrom is processed by an AND gate 314, a O/S 316 and gate 318 to energize relay 320. The contacts of relay 320 are coupled across the control junctions of a triac 322 and when the contacts are closed, the triac presents a low impedance to current flowing through electrodes 324 and 326. A solenoid coil 328 of the door lock is coupled in series with the triac and the secondary of a transformer 330; and when the contacts of relay 320 are closed the door may be opened. The pulse time of O/S 316 is selected to allow adequate time, such as 5 seconds, for a person to enter.

A key switch 332 is installed in the foyer phone panel, for example, and when closed by means of the proper key, switch 322 applies a ground to circuit 334 which in turn enables gate 312. This causes lock coil 328 to be enabled in the same manner as described above for the entry authorization signal.

The Program Mode of computer 20 (FIG. 1) will now be described with reference primarily directed to FIG. 11. In the Program Mode, a high signal which is produced as a result of mode switch 38 (FIG. 1) being positioned to the Program Mode, is applied to an inverter 336. The circuit for generating this signal will be described hereinafter.

The four output bits from a counter 338 control a decoder 340, and during periods other than the Program Mode, counter 338 is held at a reset condition by the high output signal from inverter 336. Counter 338 may be a 7490 type circuit, and decoder 340 may be a 7442 type circuit. At the start of the Program Mode output terminal 342 of decoder 340 is low, and the upper input to gate 344 is also low. The output of gate 344 is applied to one input of gate 346 and the other input thereto is applied from the normally high output terminal of a O/S 348. The output from gate 346 is applied as an "enter code number enable" signal to gate 98 of FIG. 4.

In response to the "enter code number enable" signal, the circuitry of FIG. 4 processes the first three digits dialed on programmer dial unit 42 (FIG. 1) and applied dial pulses to gate 115, in an identical manner to that described above relative to the Operate Mode.

Figure 11:
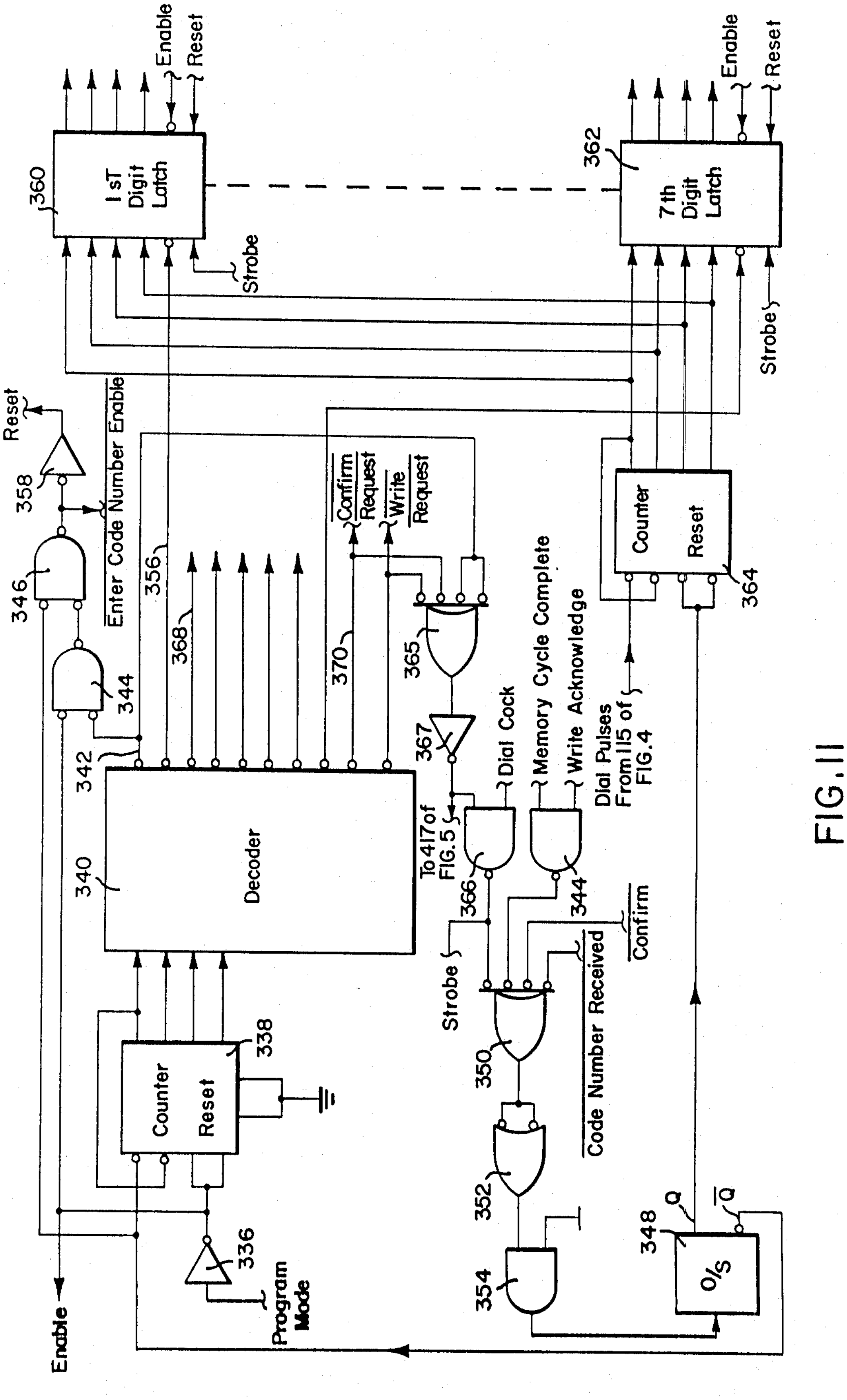
FIG. 11 is a schematic and block diagram of circuitry for programming the entry control computer so that preselected telephone numbers are stored at memory address locations defined by code numbers.

When the third digit of the code number has been received by the circuits of FIG. 4, O/S 128 produces the "code number received" signal which is applied as one input to a gate 350 of FIG. 11. In response to this signal, gates 350, 352, and 354 provide a trigger pulse to O/S 348. The signal from the $\bar{Q}$ output of O/S 348 steps counter 338 causing decoder 340 to provide an enable (low) signal on output lead 356, and the signal on lead 342 goes high. When the signal on lead 342 goes high, the output from inverter 358 goes low. The output from inverter 358 is a reset signal (when high) to the output latches which store the telephone number being programmed; and the output from inverter 336, which is low during the Program Mode, is an enable signal to the output latch circuits.

There is one output latch circuit associated with each of the seven digits of the telephone number to be programmed; but so as to maintain the clarity of the drawing only latch circuits 360 and 362, associated with the first and seventh digits of the telephone number, respectively, are shown. The implementation and operation of the other five latch circuits (not show) will be obvious from the description of circuits 360 and 362. Each of these latch circuits may be 8551 type integrated circuits.

During the second state of decoder 340 (low signal on lead 356), dial pulses originating from dial unit 42 (FIG. 1) are counted by a counter 364 and applied in a four parallel bit format to first digit latch 360. The input circuits of latch 360 are enabled by the signal on lead 356 of decoder 340.

At the end of the sequence of dial pulses for the first telephone digit the dial cock signal applied from gate 95 of FIG. 3 to AND gate 366, goes low. The low to high transition output from gate 366, applied as one of the signals to gate 350, causes O/S 348 to trigger and also strobes data into the latches, such as 360 and 362. The outputs from O/S 348 reset counter 364 and step decoder 340 to the third state. During this state the signal on lead 368 enables the inputs of the second digit latch circuit (not shown) and the value of the second telephone digit is stored therein.

The above procedure is repeated for storing each of the digits of the telephone number until the value of the seventh digit is stored in latch circuit 362. On the trailing edge of the dial cock pulse for the seventh digit, decoder 340 steps to the ninth state during which a "confirm request" signal (low) is applied to a lead 370.

As will be explained subsequently, the "confirm request" signal causes the illumination of face plate lights 48 and 50 (FIG. 1). The dialed code number and the telephone number are displayed on digital readout display units 44 and 46, respectively.

If the displayed code and telephone numbers correspond to those intended to be programmed, the confirm button 52 (FIG. 1) is depressed, and this causes a "confirm" pulse to be applied to gate 350 (FIG. 11). In response to the pulsing of gate 350, the circuitry of FIG. 11 steps decoder 340 to the next state which produces a "write request" (low) signal on a lead 372. It is noted that the operation of gate 366 is interlocked by the arrangement comprising gate 365 and inverter 367 during the first, ninth and tenth states of decoder 340.

The "write request" signal is applied to latch circuit 134 of FIG. 5, and in response thereto the circuitry of FIG. 5 produces a "write" signal at the output of gate 167 when the dialed code matches the address portion of memeory 190 (FIG. 6). The seven digit telephone number stored as 28 parallel bits in the output latches of FIG. 11, are applied to "28 to 4" multiplexer 189 of FIG. 6; wherein they are connected into sequences of 4 parallel bits each, for storage in memory 190. The writing operation of memory 190 is enabled by the "write" signal applied thereto from gate 167 of FIG. 5. It is noted that memory 190 operates on a 32 bit cycle and that only 28 data bits are applied; ie four bit positions are not used.

Following the writing operation, write acknowledge and memory cycle complete signals are applied from elements 137 and 176, respectively, of FIG. 5 to gate 349 of FIG. 11. In response to the output signal from gate 349, the circuitry of FIG. 11 steps decoder 340 and thereby completes the programming cycle.

If it is desired not to enter the displayed code and telephone numbers into memory, reject button 54 (FIG. 1) is depressed and, as will be explained subsequently, in response thereto the Program Mode signal to inverter 336 (FIG. 11) goes low. This causes counter 338 to be reset and initialize the circuitry of FIG. 11 for receiving a new set of code and telephone numbers.

Figure 12:
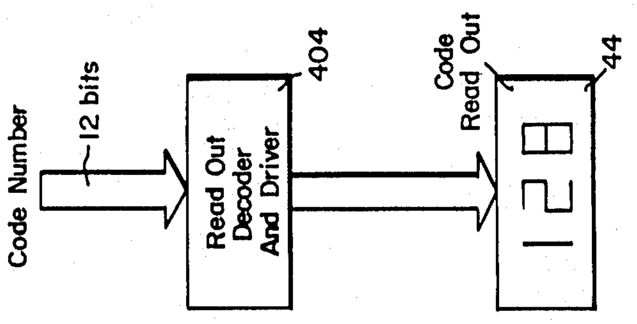

FIG. 12 shown in block diagram form, the units for presenting the digital readout of the code number during the Programing and Examine Modes. As there shown, the three digit code number is applied from decoders 110, 112 and 114 of FIG. 4, as 12 parallel bits to readout decoder and driver unit 404 (three units 400) and displayed on readout unit 44 (three units 402).

Figure 14:
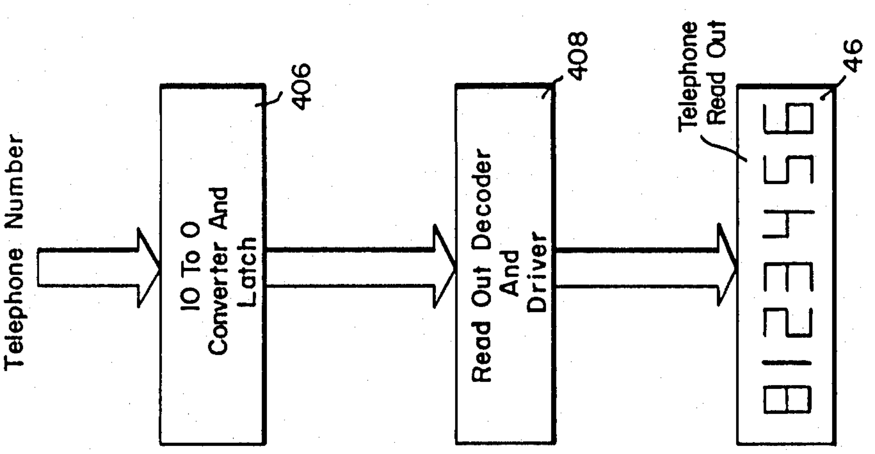

As shown in FIG. 14, the seven digit telephone number is applied from the output latches (eg 360 and 362) of FIG. 11 as 28 parallel bits (four bits per digit) to a "10 to 0" converter and latch circuit 406.

Figure 13:
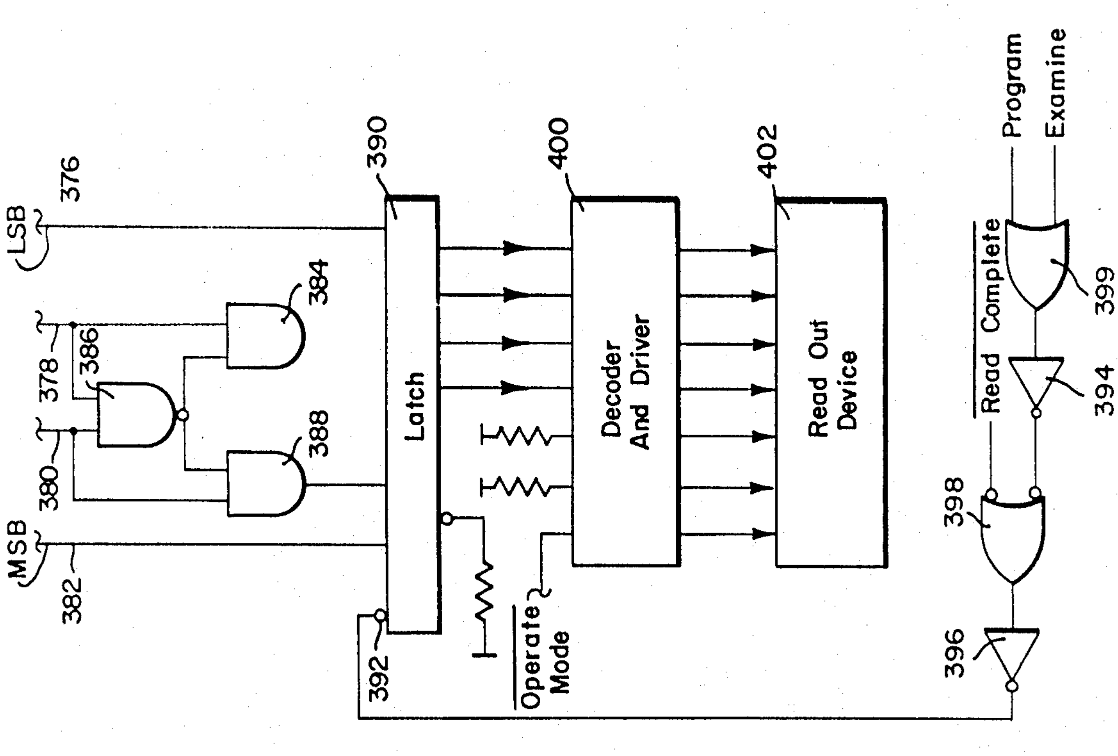
FIGS. 12 through 15 are block and schematic diagrams of the digital readout portions of the entry control computer.

A portion of unit 406 associated with one digit of the telephone number, is shown in FIG. 13, to which reference is now directed. As shown in FIG. 13, the least significant bit (LSB) of a given digit of the code number is applied on a lead 376; the next more significant bit on a lead 378; the next more significant bit on a lead 380; and the most significant bit (MSB) on a lead 382. The circuitry associated with gates 384, 386 and 388 applies the binary data to a latch circuit 390 in the same format as received except that a binary 10 (1010) is converted to a binary zero (0000).

When terminal 392 of latch circuit 390 is enabled (by a low signal) the input data applied thereto is applied to its output terminals. The enable signal for terminal 392 is produced by means of inverters 394 and 396 and gates 398 and 399 during the Program or Examine Modes, upon the application of the "read complete" pulse from gate 200 of FIG. 7. The output signals from latch circuit 390 are applied through a decoder and driver circuit 400 to a readout device 402. Decoder 400 converts the four bit binary input data to the appropriate seven signals required by readout device 402. Latch circuit 390, decoder and driver 400 and readout device 402 may be 8281, 7447 and 3015F-BN type circuits, respectively.

Again referring to FIG. 14, the output signals from converter and latch circuit 406 are processed by readout decoder and driver unit 408; and displayed on unit 46 by means of a similar mechanization to that described for the code number relative to FIG. 12.

Figure 15:
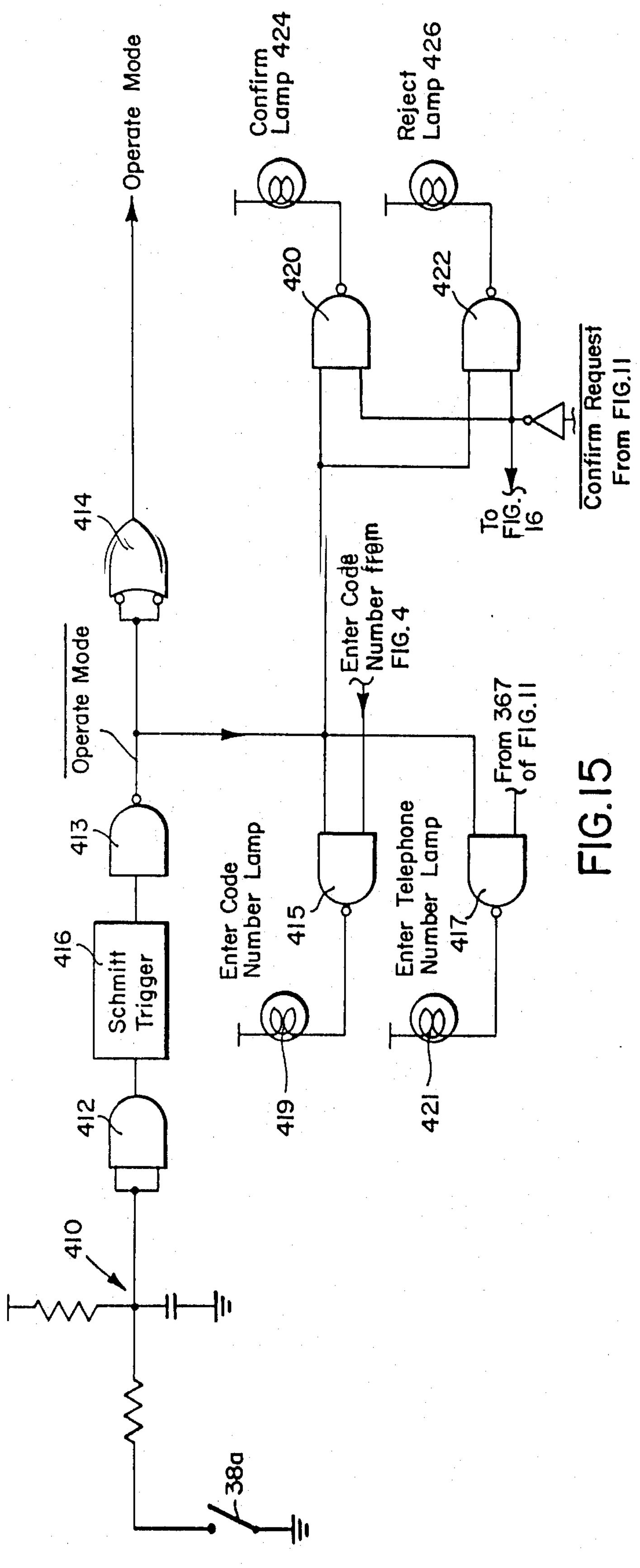

Referring now to FIG. 15, when switch 38 (FIG. 1) is in the Operate Mode, contacts 38a are open and input circuit 410, gates 412 through 414 and Schmitt trigger circuit 416 produce the "Operate Mode" signal at a terminal 418; which signal is used to control various circuits of computer 20 as explained herinabove.

The "$\overline{\text{Operate Mode}}$" signal from gate 413 is applied as one input to gates 415 and 417. The "enter code number" output from gate 98 of FIG. 4 is applied to the second input of gate 415 so that during the first state of decoder 340 the "enter code number" legend is illuminated by a lamp 419. The output from inverter 367 of FIG. 11 is applied to the second input of gate 417 so that during states 1 through 7 of decoder 340 (FIG. 11) the "enter telephone number" legend is illuminated by a lamp 421.

The "$\overline{\text{Operate Mode}}$" signal (FIG. 15) is also applied to gates 420 and 422, and the "$\overline{\text{confirm request}}$" signal from decoder 340 of FIG. 11 is applied through inverter 421 to gates 420 and 422. Gates 420 and 422 are mechanized so that lamps 424 and 426, associated with confirm and request button 52 and 54, respectively, will be illuminated during the "$\overline{\text{confirm request}}$" period of the Program Mode.

Figure 16:
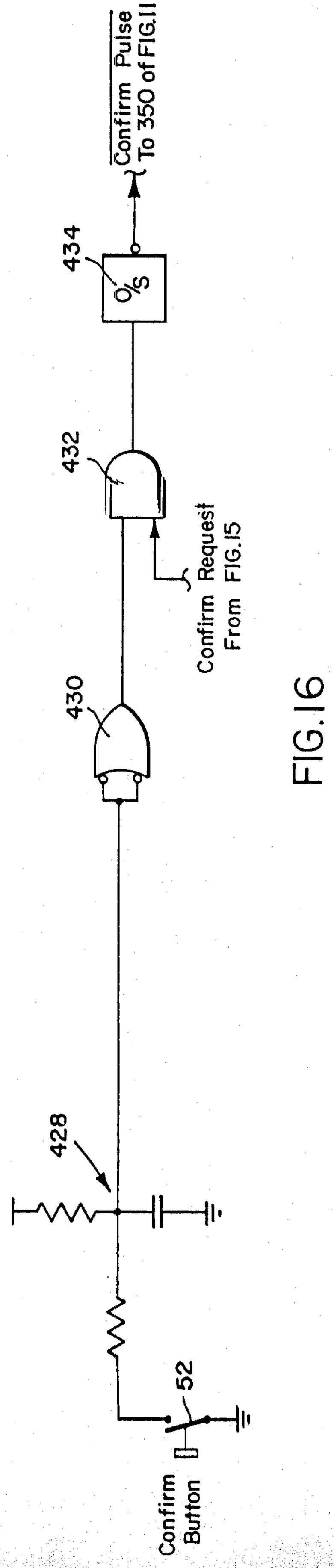
FIGS. 16 through 18 are schematic and block diagrams of circuitry for controlling the operating modes and programming operations of the entry control computer.

If the operator pushes confirm button 52, input circuit 428, gates 430 and 432 and O/S 434 of FIG. 16 produce a "$\overline{\text{confirm}}$" pulse which is applied to gate 350 of FIG. 11. In response to this signal the circuitry of FIG. 11 casuses the telephone number dialed during the preceding programing sequence to be entered into memory 190 (FIG. 6), as explained hereinabove.

Figure 17:
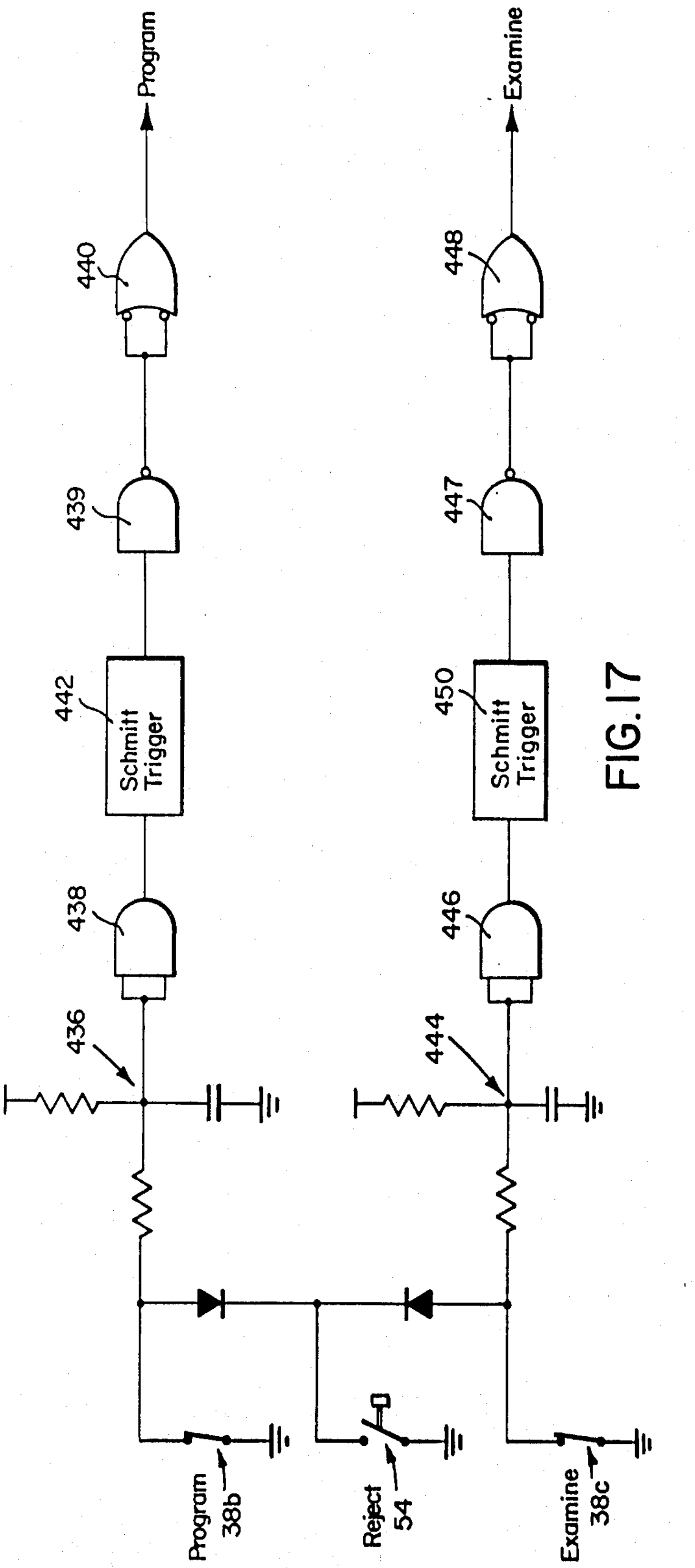

FIG. 17 depicts the circuits for producing the Program Mode and Examine Mode signals, as well as the "reject" signal. When switch 38 (FIG. 1) is in the Program Mode, contacts 38b are open (opposite from position shown) and input circuits 436, gates 438 through 440 and Schmitt trigger 442 produce the Program Mode signal. When switch 38 (FIG. 1) is in the Examine Mode contacts 38c are open (opposite from position shown) and input circuits 444 and gates 446 through 448 and Schmitt trigger 450 produce the Examine Mode signal. When reject button 54 is depressed, the Program and Examine Mode signals are held low and as explained above relative to FIG. 11, this "erases" the data of the current programing sequence and initializes the circuits of FIG. 11 for receiving the new set of code and telephone numbers to be programed.

When switch 38 (FIG. 1) is positioned to the Examine Mode, a high signal is applied to an inverter 77 of FIG. 3 and is processed by gate 79 and inverter 75 to disable flip-flop 72 so that demultiplexer 74 does not switch past the second state, which is "$\overline{\text{read request}}$". Consequently, in the Examine Mode only the "$\overline{\text{receive code dial pulses}}$" and the "$\overline{\text{read request}}$" operations are performed. The circuitry of FIGS. 3, 4, and 5 operate to read the telephone numbers from the location in memory 190 (FIG. 6) which corresponds to the code number dialed on unit 42 (FIG. 1); and the circuit of FIGS. 11, 12, 13 and 14 operates to display the code number and the retrieved telephone number on readout units 44 and 46, respectively.

Figure 18:
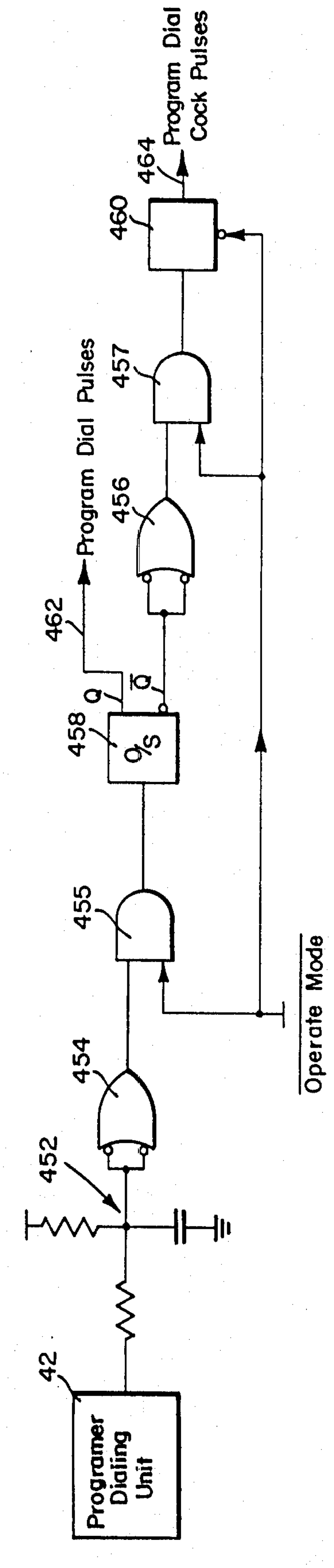

Referring now to FIG. 18, during the Program and Examine Modes, the dial pulses from unit 42 are applied to an input circuit 452 and are processed by gates 454 through 457 and O/S circuits 458 and 460 to produce program dial pulses at a terminal 462 and program dial cock pulses at a terminal 464. The operation of the just listed circuits is similar to that described relative to circuits of FIG. 3 which produce corresponding signals for the operation of the foyer phone. The dialing pulses from O/S 458 are "ORed" with the dialing pulses from the foyer phone in gate 115 of FIG. 4 to produce the "combined dial pulse" signals used by the circuits of FIGS. 4 and 11. The program cock pulses from O/S 460 are ORed with the cock pulses from the foyer phone in gate 95 of FIG. 3 to produce the dial cock signals used by the circuits of FIGS. 4 and 11.

In accordance with a second embodiment of the invention, the called party may authorize entry by actuating a preselected key button on a touch-tone type phone or by dialing a preselected digit on a dial type phone set. The structure of the entry control system as described hereinabove relative to FIGS. 1 through 18 remains unchanged for the second embodiment except that the circuitry of FIG. 19 is employed in lieu of the circuitry of FIG. 9; and tone generator 32 (FIG. 1) is not required.

Figure 19:
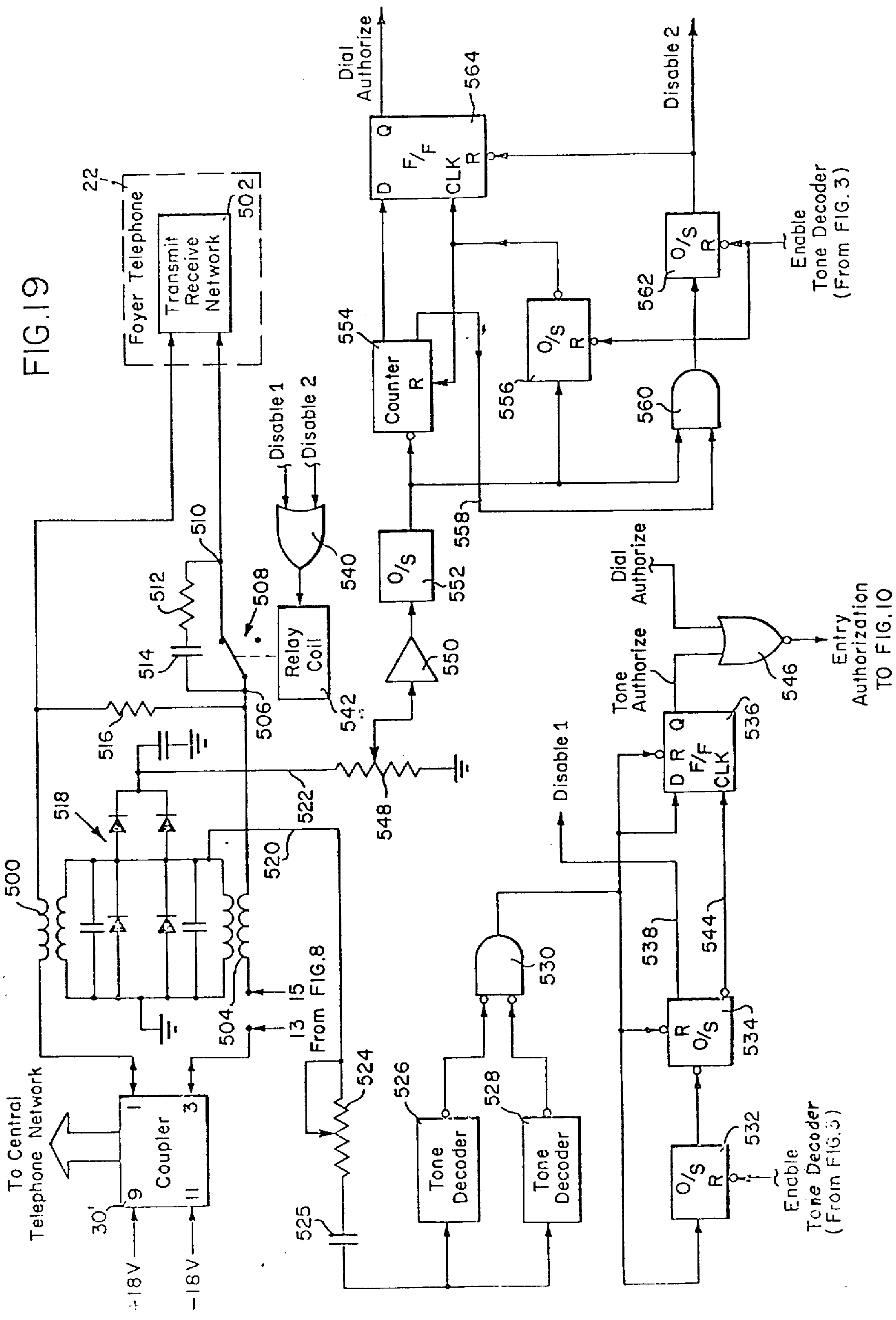
FIG. 19 is a schematic and block diagram of a second embodiment of circuitry for interfacing with the central telephone network and for producing "entry authorization" signals.

Referring now primarily to FIG. 19, dial pulses from terminals 13 and 15 of FIG. 8 are applied in series with terminal 3 of coupler 30', and the coupler operates in a conventional manner so as to cause telephone 28 (FIG. 1) of the called apartment unit to be connected to terminals 1 and 3 of the coupler. Telephone coupler 30' may be leased from the Telephone Company and could be Universal Service Order code Number STC. manufactured for or by the Western Electric Company. It is noted that coupler 30' may be eliminated if the Telephone Company regulations so allow; in which case the leads shown connected to coupler 30' would be connected to the telephone lines.

As shown in FIG. 19 terminal 1 of coupler 30' is coupler through coil 500 to one input of a transmit-receive network 502 within foyer telephone 22. Network 502 may be any suitable unit for interfacing with the transmitter and receiver elements of telephones, such as network WA1154A manufactured by or for the Automatic Electric Company, for example, and is a standard element in telephone sets.

Terminal 3 of coupler 30' is coupled through the contacts of relay 266 (FIG. 8) and through coil 504 to an input terminal 506 of a relay 508. One output terminal 510 of relay 508 is connected to a second input of transmit-receive network 502; and resistor 512 and capacitor 514 are series coupled across relay terminals 506 and 510.

As will be explained more fully subsequently, relay 508 is enabled prior to "entry authorization" so as to break the direct current path to unit 502 and prevent the transmitter of telephone 22 from functioning. Resistor 516 is connected across coils 500 and 504 so as to allow sufficient direct current flow to coupler 30' to prevent the connection between the foyer phone and the called apartment from being lost during the period relay 508 is enabled. The AC path through resistor 512 and capacitor 514 allows the receiver of telephone 22 to function during the period relay 508 is enabled.

A portion of the signals passing through coils 500 and 504 is coupled to a network 518 which in turn applies output signals to leads 520 and 522.

It is noted that the circuitry of FIG. 19 is adapted to operate in response to entry authorization signals supplied from either a touch-tone or dial type phone set in the called apartment. Considering first the situation in which the called apartment is equipped with a touch-tone telephone set, actuation of a key button on the telephone of the called apartment results in a pair of tone signals being applied through the central telephone network, coupler 30', coils 500 and 504 and network 518 to output lead 520. Lead 520 is coupled through a sensitivity control potentiometer 524 and a capacitor 525 to the inputs of tone decoders 526 and 528. Decoders 526 and 528 may be any suitable units which are enabled in response to a signal within a preselected frequency zone, such as type NE567, for example. The output signals from decoders 526 and 528 are applied to the inputs of a gate 530, which may be a type DM7402, and its output signal is applied to the signal input of a O/S 532 and to the reset input of a O/S 534 and a flip-flop 536. O/S units 532 and 534 may be type DM 9602 and flip-flop 536 type DM7474, for example.

Tone decoders 526 and 528 are selected such that each one responds to a different one of the pair of tones associated with a selected key button of a touch-tone type telephone, and in response to receipt of such a pair of tones the gate 530 is enabled. This in turn triggers O/S 532 and disables the reset function of O/S 534 and flip-flop 536. It is noted that O/S 532 is held at its reset state unless the enable tone decoder signal applied from demultiplexer 74 of FIG. 3 is low. As was explained hereinabove, this enable tone decoder signal is only low during the operational state of the system in which entry authorization is allowed.

O/S 532 is of the retriggerable type which provides an output pulse of 100 to 300 milliseconds, for example; and on the trailing edge of this output pulse O/S 534 is triggered to provide an output pulse of 400 milliseconds, for example. The pulse at output 538 of O/S 534 is designated "disable 1" and is applied through gate 540 to enable coil 542 of relay 508. In response to this disable signal, relay 508 operates to disable the transmitter of the foyer telephone to insure that "entry authorizing" tones are not appplied by means of the foyer telephone. On the trailing edge of the pulse produced by O/S 534 the signal at its complimentary output 544 goes high and enables the "CLK" input of flip-flop 536. In response to a high signal applied to the "D" input of flip-flop 536 from gate 530 the Q output of the flip-flop 536 is switched to the high state to provide the "tone authorize" signal which is coupled through gate 546 and enables the gate entry circuitry of FIG. 10.

Considering now the situation in which the called apartment is equipped with a dial type telephone set, the dialing of a digit on such a phone produces "noise" signals, coincident with the leading and trailing edges of each dial pulse, which are coupled through the central telephone network to network 518. It is noted that since there is not a direct circuit path through the central telephone network that recognition of the possibility of detecting and using the associated noise pulses is a significant feature of the entry authorization system of FIG. 19.

The noise pulses applied to network 518 are rectified therein to provide a pair of output pulses for each applied dial pulse; and these output pulses are applied through sensitivity control potentiometer 548 and an amplifier 550 to a retriggerable O/S 552, which may be type NE555, for example. The output pulse from O/S 552, which may be 35 milliseconds in duration, for example, is applied to a counter 554 and a O/S 556. Counter 554 may be a divide by sixteen counter type DM7493, for example, and O/S 556 a retriggerable type DM9602 with a pulse duration of 75 milliseconds, for example.

The output terminals of selected counting stages of counter 554 are connected by means of lead 558 to one input of an AND gate 560. The output of O/S 552 is coupled to the other input of gate 560; and the output signal from gate 560 is applied as an input signal to a O/S 562. O/S 562 which is a retriggerable type such as a DM9602 may have an output pulse of 300 milliseconds, for example. The output signal from O/S 562 is designated "disable 2" and is applied to gate 540 and to the reset terminal of a flip-flop 564. Flip-flop 564 may be type DM7474, for example.

In the operation of the "dial authorization" portion of FIG. 19, if the party in the called apartment desires to authorize entry a preselected digit, such as 4 for example, is dialed. Noise pulses coincident with the leading and trailing edges of each of the resulting four dial pulses (eight noise pulses) are rectified by network 518 and applied through potentiometer 548 and amplifier 550 to O/S 552. The 35 millisecond, for example, output pulses from O/S 552 are applied to counter 554 and to O/S 556. It is noted that counter 554 is reset when the complimentary output from O/S 556 is high. However since the spacing between noise pulses originating from dial pulses is less than 75 milliseconds the counter will not be reset during the processing of a sequence of signals originating from dial pulses. This results from the fact that O/S 556 is retriggered prior to the termination of its 75 millisecond pulse duration.

Counter 554 is incremented one count upon the trailing edge of each output pulse from O/S 552 and the counter's output stages corresponding to counts of 4, 5, 6, 7, 12, 13, 14 and 15 are connected by lead 558 to gate 560. On the output pulse from O/S 552 following each of the just listed counts O/S 562 is triggered, so as to produce the "disable 2" signal and to remove the reset signal to flip-flop 564. The "disable 2" is applied to relay 508 and thereby disables the transmitter function of the foyer phone as explained hereinabove relative to the "disable 1" signal. It is noted that since gate 560 is not enabled until counter 554 holds the count of 4, that the "disable 2" signal will not be produced except in response to signals originating from dial type pulses. This prevents enabling relay 508, and thereby interrupts the transmitter function of the foyer telephone, in response to random noise signals or in response to normal audio signals.

The output stages of counter 554 corresponding to counts of 8 through 15 are coupled to the "D" input of flip-flop 564 and the "dial authorize" signal from the Q output is applied through gate 546 and enables the gate entry circuitry of FIG. 10. It is noted that in the embodiment of FIG. 19 that the "dial authorize" signal may be produced in response to the dialing of the digits 4, 5, 6, or 7 on the telephone of the called apartment. This implementation insures that the entry system will operate properly in the environment where random noise pulses are present on the lines. In this regard it is noted that the security of the system is primarily provided by the features which allow only signals from the called apartment to authorize entry, rather than by limiting the "entry authorizing" digit to a single number.

Hence the embodiment of FIG. 19 provides a simple and convenient method for the entry authorization by tenants having either dial or touch-tone type phones; while prohibiting entry authorization in response to signals from the foyer area.

Although the preferred embodiments of the invention were described hereinabove with respect to an apartment complex type installation, it is to be understood that the invention is not limited to such uses and is suitable for a wide range of applications which require an authorization type signal be provided from a remotely located approving station. Further, although a three digit code number implementation was shown for the preferred embodiments, it is noted that systems adapted for using code numbers having more or less digits may readily be mechanized in accordance with the invention.

Thus having described a new and useful entry control system; what is claimed is:

1. A security entry system adapted for use in conjunction with a foyer telephone located outside of an entry gate, a central telephone system, and the telephones of a plurality of approving stations, for causing the foyer telephone to be electrically connected through the central telephone system to the telephone of a selected approving station and for enabling the latch release mechanism of the gate in response to a preselected type of signal applied from the telephone of the selected approving station, said security entry system comprising:

digital memory means for storing data representative of the telephone number of each of the approving stations at respective memory address locations defined by a preselected code number for each of the approving stations, dialing means, responsive to a code number dialed on the foyer telephone, for retrieving from said digital memory means the telephone number data for the approving station which corresponds to the dialed code number, and for applying dial pulses representative of the retrived telephone number data to the central telephone system so as to cause the telephone of the selected approving station to be electrically connected through the central telephone system to the foyer telephone; and actuation means electrically connected to the telephone of the selected approving station through the central telephone system, for enabling the latch release mechanism of the gate in response to said preselected type of signal applied from the telephone at the selected approving station, said actuation means including processing means for responding only to signals within a preselected frequency range and means for inhibiting the signal transmission operation of the foyer telephone during a period following the first detection of a signal within said preselected frequency range but before said latch release mechanism is enabled.

2. A security entry system adapted for use in conjunction with a foyer telephone located outside of an entry gate, a central telephone system, and the telephones of a plurality of approving stations, for causing the foyer telephone to be electrically connected through the central telephone system to the telephone of a selected approving station and for enabling the latch release mechanism of the gate in response to a preselected type of signal applied from the telephone of the selected approving station, said security entry system comprising:

digital memory means for storing data representative of the telephone number of each of the approving stations at respective memory address locations defined by a preselected code number for each of the approving stations;

dialing means, responsive to a code number dialed on the foyer telephone, for retrieving from said signal memory means the telephone number data for the approving station which corresponds to the dialed code number, and for applying dial pulses representative of the retrived telephone number data to the central telephone system so as to cause the telephone of the selected approving station to be electrically connected through the central telephone system to the foyer telephone; and actuation means electrically connected to the telephone of the selected approving station through the central telephone system, for enabling the latch release mechanism of the gate in response to said preselected type of signal applied from the telephone at the selected approving station, said actuation means including processing means for responding only to signals having frequency components within each of two preselected frequency ranges, and means for inhibiting the signal transmission operation of the foyer telephone during a period following the first detection of a signal having frequency components with each of the two preselected frequency ranges, but before said latch release mechanism is enabled.

3. A security entry system adapted for use in conjunction with a foyer telephone located outside of an entry gate, a central telephone system, and the telephones of a plurality of approving stations, for causing the foyer telephone to be electrically connected through the central telephone system to the telephone of a selected approving station and for enabling the latch release mechanism of the gate in response to a preselected type of signal applied from the telephone of the selected approving station, said security entry system comprising:

digital memory means for storing data representative of the telephone number of each of the approving stations at respective memory address locations defined by a preselected code number for each of the approving stations;

dialing means, responsive to a code number dialed on the foyer telephone, for retrieving from said digital memory means the telephone number data for the approving station which corresponds to the dialed code number, and for applying dial pulses represntive of the retrieved telephone number data to the central telephone system so as to cause the telephone of the selected approving station to be electrically connected through the central telephone system to the foyer telephone; and actuation means electrically connected to the telephone of the selected approving station through the central telephone system, for enabling the latch release mechanism of the gate in response to said preselected type of signal applied from the telephone at the selected approving station, said actuation means including means for inhibiting the signal transmission operation of said foyer telephone after said preselected type of signal is detected for a first time period and means for preventing the enabling of the latch release mechanism unless the detection of said preselected type of signal continues while the signal transmission operation of said foyer telephone is inhibited.

4. A security entry system adapted for use in conjunction with a foyer telephone located outside of an entry gate, a central telephone system, and the telephones of a plurality of approving stations, for causing the foyer telephone to be electrically connected through the central telephone system to the telephone of a selected approving station and for enabling the latch release mechanism of the gate in response to a preselected type of signal applied from the telephone of the selected approving station, said security entry system comprising:

digital memory means for storing data representative of the telephone number of each of the approving stations at respective memory address locations defined by a preselected code number for each of the approving stations;

dialing means, responsive to a code number dialed on the foyer telephone, for retrieving from said digital memory means the telephone number data for the approving station which corresponds to the dialed code number, and for applying dial pulses representative of the retrieved telephone number data to the central telephone system so as to cause the telephone of the selected approving station to be electrically connected through the central telephone system to the foyer telephone; and actuation means electrically connected to the telephone of the selected approving station through the central telephone system, for enabling the latch release mechanism of the gate in response to said preselected type of signal applied from the telephone at the selected approving station, said actuation means including signal processing means for enabling the latch release mechanism of the gate in response to the receipt of signals resulting from the dialing of a preselected digit on the telephone of the selected approving station; said signal processor means including means for providing a dial authorize signal in response to receipt of a preselected number of noise type pulses which occur at the leading and trailing edges of each dial pulse, and means for enabling the latch release mechanism in response to said dial authorize signal.

5. The security entry system of claim 4 wherein said actuation means includes means for inhibiting the signal transmission operation of said foyer telephone after a number, less than said preselected number, of said noise pulses has been received.

6. A security entry system adapted for use in conjunction with a foyer telephone located outside of an entry gate, a central telephone system, and the telephones of a plurality of approving stations, for causing the foyer telephone to be electrically connected through the central telephone system to the telephone of a selected approving station and for enabling the latch release mechanism of the gate in response to a preselected type of signal applied from the telephone of the selected approving station, said security entry system comprising:

digital memory means for storing data representative of the telephone number of each of the approving stations at respective memory address locations defined by a preselected code number for each of the approving stations;

dialing means, responsive to a code number dialed on the foyer telephone, for retrieving from said digital memory means the telephone number data for the approving station which corresponds to the dialed code numer, and for applying dial pulses representative of the retrieved telephone number data to the central telephone system so as to cause the telephone of the selected approving station to be electrically connected through the central telephone system to the foyer telephone;

actuation means electrically connected to the telephone of the selected approving station through the central telephone system, for enabling the latch release mechanism of the gate in response to said preselected type of signal applied from the telephone at the selected approving station; and programming means for programming data representative of the telephone numbers of the approving stations into said digital means at respective memory address locations defined by a preselected code number for each of the approving stations, said programming means including means for dialing the code number and the corresponding telephone number of a given approving station; means for temporarily storing the dialed code and telephone numbers; display means for providing a digital readout representative of the temporarily stored code and telephone numbers; selection means for selectively confirming the displayed code and telephone numbers; and means responsive to said selection means for writing the temporarily stored telephone number into said digital memory means at an address location defined by the temporarily stored code number.

7. The security entry system of claim 6 wherein said display means includes means for displaying the digits of said temporarily stored telephone number data which have a numerical value of ten as zeros.

8. A security entry system adapted for use in conjunction with a foyer telephone located outside of an entry gate, a central telephone system, and the telephones of a plurality of approving stations, for causing the foyer telephone to be electrically connected through the central telephone system to the telephone of a selected approving station and for enabling the latch release mechanism of the gate in response to a preselected type of signal applied from the telephone of the selected approving station, said security entry system comprising:

digital memory means for storing data representative of the telephone number of each of the approving stations at respective memory address locations defined by a preselected code number for each of the approving stations;

dialing means, responsive to a code number dialed on the foyer telephone, for retrieving from said digital memory means the telephone number data for the approving station which corresponds to the dialed code number, and for applying dial pulses representative of the retrieved telephone number data to the central telephone system so as to cause the telephone of the selected approving station to be electrically connected through the central telephone system to the foyer telephone;

actuation means electrically connected to the telephone of the selected approving station through the central telephone system, for enabling the latch release mechanism of the gate in response to said preselected type of signal applied from the telephone at the selected approving station;

means for dialing code numbers;

means for temporarily storing the dialed code number;

means responsive to the temporarily stored code number for producing an address signal corresponding thereto;

means for cycling the stored telephone number data in said digital memory until a match between the address location of said stored telephone number data and said address signal is detected;

means for reading out and temporarily storing the telephone number data from the address location at which the match is detected; and display means for providing a digital readout representation of said temporarily stored code number and telephone number data.

9. A security entry system adapted for use in conjunction with a foyer telephone located outside of an entry gate, a central telephone system, and the telephones of a plurality of approving stations, for causing the foyer telephone to be electrically connected through the central telephone system to the telephone of a selected approving station and for enabling the latch release mechanism of the gate in response to a preselected type of signal applied from the telephone of the selected approving station, said security entry system comprising:

digital memory means for storing data representative of the telephone number of each of the approving stations at respective memory address locations defined by a preselected code number for each of the approving stations;

dialing means, responsive to a code number dialed on the foyer telephone, for retrieving from said digital memory means the telephone number data for the approving station which corresponds to the dialed code number, and for applying dial pulses representative of the retrieved telephone number data to the central telephone system so as to cause the telephone of the selected approving station to be electrically connected through the central telephone system to the foyer telephone, said dialing means including means for producing an address signal corresponding to the code number dialed on the foyer telephone, means for reading out and temporarily storing the telephone number data from the address location in said digital memory means corresponding to said address signal, and dial pulse generating means responsive to said temporarily stored telephone number data for producing dialing pulses indicative of the telephone number of the corresponding approving station; said dial pulse generating means including means for sequentially applying a portion of said temporarily stored telephone number data which is representative of one digit of the telephone number to a counter such that said counter is initialized to a value equal to the complement of said one digit, and means for sequentially producing dial pulses and for incrementing said counter upon the generation of each dial pulse until said counter holds a preselected count, whereby dial pulses equal in number to the value of said one digit of the telephone number are generated; and actuation means electrically connected to the telephone of the selected approving station through the central telephone system, for enabling the latch release mechanism of the gate in response to said preselected type of signal applied from the telephone at the selected approving station.

10. The security entry system of claim 9 wherein said dial pulse generating means includes means for inhibiting the production of dial pulses until said counter has been initialized to a value equal to the complement of the first digit of the telephone number.

11. A security entry system adapted for use in conjunction with, foyer telephone located outside of an entry gate, a central telephone system, and the telephones of a plurality of approving stations, for causing the foyer telephone to be electrically connected through the central telephone system to the telephone of a selected approving station and for enabling the latch release mechanism of the gate in response to either the dialing of a preselected digit or the depressing of a preselected key button on the telephone of the selected approving station, said security entry system comprising:

memory means for storing data representative of the telephone number of each of the approving stations as a function of preselected code numbers;

dialing means, responsive to a code number dialed on the foyer telephone, for retrieving from said memory means the telephone number data for the approving station which corresponds to the dialed code number, and for applying dial pulses representative of the retrieved telephone number data to the central telephone system so as to cause the telephone of the selected approving station to be electrically connected through the central telephone system to the foyer telephone system; and actuation means, coupled to the telephone of the selected approving station through the central telephone system, for enabling the latch mechanism of the gate in response to the receipt of authorizing signals produced by either the dialing of a preselected digit or the depressing of a preselected key button on the telephone of the selected approving station, said actuation means including means for inhibiting the signal transmission operation of said foyer telephone after said authorizing signal is detected for a first time period and means for preventing the enabling of the latch release mechanism unless the detection of said authorizing signal continues while the signal transmission operation of said foyer telephone is inhibited.

12. A security entry system adapted for use in conjunction with, a foyer telephone located outside of an entry gate, a central telephone system, and the telephones of a plurality of approving stations, for causing the foyer telephone to be electrically connected through the central telephone system to the telephone of a selected approving station and for enabling the latch release mechanism of the gate in response to either the dialing of a preselected digit or the depressing of a preselected key button on the telephone of the selected approving station, said security entry system comprising:

memory means for storing data representative of the telephone number of each of the approving stations as a function of preselected code numbers;

dialing means, responsive to a code number dialed on the foyer telephone, for retrieving from said memory means the telephone number data for the approving station which corresponds to the dialed code number, and for applying dial pulses representative of the retrieved telephone number data to the central telephone system so as to cause the telephone of the selected approving station to be electrically connected through the central telephone system to the foyer telephone system; and actuation means, coupled to the telephone of the selected approving station through the central telephone system, for enabling the latch mechanism of the gate in response to the receipt of authorizing signals produced by either the dialing of a preselected digit or the depressing of a preselected key button on the telephone of the selected approving station, said actuation means including means for providing a dial authorize signal in response to a preselected number of noise type pulses which occur at the leading and trailing edges of each dial pulse, and means for enabling the latch release mechanism in response to the dial authorize signal.

13. The security entry system of claim 12 wherein said actuation means includes means for inhibiting the signal transmission operation of said foyer telephone after a number, less than said preselected number, of said noise pulses has been received.

14. A security entry system adapted for use in conjunction with, a foyer telephone located outside of an entry gate, a central telephone system, and the telephones of a plurality of approving stations, for causing the foyer telephone to be electrically connected through the central telephone system to the telephone of a selected approving station and for enabling the latch release mechanism of the gate in response to either the dialing of a preselected digit or the depressing of a preselected key button on the telephone of the selected approving station, said security entry system comprising:

memory means for storing data representative of the telephone number of each of the approving stations as a function of preselected code numbers;

dialing means, responsive to a code number dialed on the foyer telephone, for retrieving from said memory means the telephone number data for the approving station which corresponds to the dialed code number, and for applying dial pulses representative of the retrieved telephone number data to the central telephone system so as to cause the telephone of the selected approving station to be electrically connected through the central telephone system to the foyer telephone system;

actuation means, coupled to the telephone of the selected approving station through the central telephone system, for enabling the latch mechanism of the gate in response to the receipt of authorizing signals produced by either the dialing of a preselected digit or the depressing of a preselected key button on the telephone of the selected approving station; and a programming unit including means for dialing the code number and the corresponding telephone number of a given approving station, means for temporarily storing the dialed code and telephone numbers, display means for providing a digital readout representative of the temporarily stored code and telephone numbers, selection means for selectively confirming the displayed code and telephone numbers, and means responsive to said selection means for writing the temporarily stored telephone number into said memory means at an address location defined by the temporarily stored code number.

15. A security entry system adapted for use in conjunction with, a foyer telephone located outside of an entry gate, a central telephone system, and the telephones of a plurality of approving stations, for causing the foyer telephone to be electrically connected through the central telephone system to the telephone of a selected approving station and for enabling the latch release mechanism of the gate in response to either the dialing of a preselected digit or the depressing of a preselected key button on the telephone of the selected approving station, said security entry system comprising:

memory means for storing data representative of the telephone number of each of the approving stations as a function of preselected code numbers;

dialing means, responsive to a code number dialed on the foyer telephone, for retrieving from said memory means the telephone number data for the approving station which corresponds to the dialed code number, and for applying dial pulses representative of the retrieved telephone number data to the central telephone system so as to cause the telephone of the selected approving station to be electrically connected through the central telephone system to the foyer telephone system;

actuation means, coupled to the telephone of the selected approving station through the central telephone system, for enabling the latch mechanism of the gate in response to the receipt of authorizing signals produced by either the dialing of a preselected digit or the depressing of a preselected key button on the telephone of the selected approving station;

means for dialing code numbers;

means for temporarily storing the dialed code number;

means responsive to the temporarily stored code number for producing an address signal corresponding thereto;

means for reading out and temporarily storing the telephone number data from the address location in said memory means corresponding to said address signal; and display means for providing a digital readout representation of said temporarily stored code number and telephone number data.

* * * * *

UNITED STATES PATENT AND TRADEMARK OFFICE

CERTIFICATE OF CORRECTION

PATENT NO. : 3,917,911

DATED : November 4, 1975

INVENTOR(S) : James M. Lesher

It is certified that error appears in the above-identified patent and that said Letters Patent are hereby corrected as shown below:

Figure 19 on Sheet 13 of the Drawings as attached hereto is hereby added to the above-identified U. S. Patent No. 3,917,911.

Signed and Sealed this

*Seventh* Day of *June 1983*

[SEAL]

*Attest:*

DONALD J. QUIGG

*Attesting Officer* *Acting Commissioner of Patents and Trademarks*